(12) United States Patent
Sen et al.

(10) Patent No.: US 10,728,180 B2
(45) Date of Patent: Jul. 28, 2020

(54) APPARATUS, STORAGE MEDIUM AND METHOD FOR ADAPTIVE BITRATE STREAMING ADAPTATION OF VARIABLE BITRATE ENCODINGS

(71) Applicants: AT&T INTELLECTUAL PROPERTY I, L.P., Atlanta, GA (US); UNIVERSITY OF CONNECTICUT, Storrs, CT (US)

(72) Inventors: Subhabrata Sen, Westfield, NJ (US); Shuai Hao, Hillsborough, NJ (US); Yanyuan Qin, Mansfield, CT (US); Bing Wang, Storrs Mansfield, CT (US); Krishna R. Pattipati, Storrs, CT (US)

(73) Assignees: AT&T Intellectual Property I, L.P., Atlanta, GA (US); University of Connecticut, Storrs, CT (US)

( * ) Notice: Subject to any disclaimer, the term of this patent is extended or adjusted under 35 U.S.C. 154(b) by 0 days.

(21) Appl. No.: 16/107,550

(22) Filed: Aug. 21, 2018

(65) Prior Publication Data

US 2020/0067852 A1   Feb. 27, 2020

(51) Int. Cl.
*H04L 12/861* (2013.01)
*H04L 29/06* (2006.01)

(52) U.S. Cl.
CPC ...... *H04L 49/9005* (2013.01); *H04L 65/4069* (2013.01)

(58) Field of Classification Search
CPC ......... H04N 21/2387; H04N 21/44209; H04N 21/44004; H04N 21/2662; H04N 19/40;
(Continued)

(56) References Cited

U.S. PATENT DOCUMENTS

| 7,263,126 B2 | 8/2007 | Zhao et al. |
| 8,290,038 B1 | 10/2012 | Wang et al. |

(Continued)

FOREIGN PATENT DOCUMENTS

| WO | 2014209495 A1 | 12/2014 |
| WO | 2017102713 A1 | 6/2017 |

OTHER PUBLICATIONS

Duanmu, Zhengfang et al., "A Quality-Of-Experience Database for Adaptive Video Streaming", IEEE Transactions on Broadcasting, Apr. 30, 2018, 3 pages.

(Continued)

*Primary Examiner* — Sargon N Nano
(74) *Attorney, Agent, or Firm* — Guntin & Gust, PLC; Douglas Schnabel

(57) ABSTRACT

Aspects of the subject disclosure may include, for example, communicating with a source of streaming media, wherein the streaming media is variable bitrate encoded, wherein the streaming media comprises a first plurality of chunks, wherein each of the first plurality of chunks corresponds to a first portion of the streaming media, wherein the streaming media comprises a second plurality of chunks, wherein each of the second plurality of chunks corresponds to a second portion of the streaming media, wherein the streaming media comprises a third plurality of chunks, and wherein each of the third plurality of chunks corresponds to a third portion of the streaming media; obtaining, from the source, a first one of the first plurality of chunks; and determining which of the second plurality of chunks and third plurality of chunks to obtain. Other embodiments are disclosed.

20 Claims, 31 Drawing Sheets

(58) Field of Classification Search
CPC .. H04N 21/4392; H04N 19/14; H04N 19/517; H04N 19/52; H04L 65/602; H04L 65/4069; H04L 49/9005; H04L 65/608; H04L 65/607; H04L 65/4084; H04L 47/38; H04L 12/861; H04L 29/06; G10L 19/24

See application file for complete search history.

(56) References Cited

U.S. PATENT DOCUMENTS

| | | | |
|---|---|---|---|
| 8,396,114 B2 | 3/2013 | Gu et al. | |
| 8,416,849 B2 | 4/2013 | Xu | |
| 8,897,370 B1 | 11/2014 | Wang et al. | |
| 8,924,580 B2* | 12/2014 | Begen | B63B 15/0083 709/231 |
| 9,020,039 B2 | 4/2015 | Van | |
| 9,060,207 B2 | 6/2015 | Scherkus et al. | |
| 9,083,640 B2 | 7/2015 | Gutarin et al. | |
| 9,191,284 B2 | 11/2015 | Kordasiewicz et al. | |
| 9,225,980 B2 | 12/2015 | Brydon et al. | |
| 9,294,531 B2* | 3/2016 | Zhang | H04L 65/601 |
| 9,369,772 B1 | 6/2016 | Fei | |
| 9,386,308 B2* | 7/2016 | Li | H04L 65/4084 |
| 9,398,347 B2 | 7/2016 | Jadallah et al. | |
| 9,398,488 B2 | 7/2016 | Shen et al. | |
| 9,402,114 B2 | 7/2016 | Gahm et al. | |
| 9,438,883 B2 | 9/2016 | Oyman | |
| 9,444,870 B2 | 9/2016 | Phillips et al. | |
| 9,479,562 B2 | 10/2016 | Funge et al. | |
| 9,485,289 B2 | 11/2016 | Zhu et al. | |
| 9,503,491 B2 | 11/2016 | Hurst et al. | |
| 9,516,085 B2 | 12/2016 | McCarthy et al. | |
| 9,521,177 B2 | 12/2016 | Gahm et al. | |
| 9,544,352 B2 | 1/2017 | Mueller et al. | |
| 9,621,604 B2 | 4/2017 | Ramakrishnan | |
| 9,686,332 B1 | 6/2017 | Binns et al. | |
| 9,712,860 B1 | 7/2017 | Waggoner et al. | |
| 9,787,987 B2 | 10/2017 | Yadav | |
| 9,794,601 B2 | 10/2017 | Li et al. | |
| 9,807,137 B2* | 10/2017 | Forsman | H04N 21/64322 |
| 9,888,052 B2 | 2/2018 | Botsford et al. | |
| 10,298,985 B2* | 5/2019 | Kalagi | H04N 21/2662 |
| 2004/0156624 A1* | 8/2004 | Kent, Jr. | H04N 5/775 386/263 |
| 2006/0083303 A1* | 4/2006 | Han | H04N 19/70 375/240.08 |
| 2007/0177620 A1* | 8/2007 | Ohmuro | G10L 19/005 370/412 |
| 2009/0003458 A1 | 1/2009 | Au et al. | |
| 2009/0052552 A1* | 2/2009 | Gutman | H04N 21/2356 375/240.26 |
| 2010/0195713 A1* | 8/2010 | Coulombe | H04N 19/172 375/240.02 |
| 2012/0331106 A1 | 12/2012 | Ramamurthy et al. | |
| 2013/0227158 A1 | 8/2013 | Miller et al. | |
| 2014/0019633 A1* | 1/2014 | Zhang | H04L 65/601 709/231 |
| 2014/0201324 A1 | 7/2014 | Zhang et al. | |
| 2014/0215085 A1* | 7/2014 | Li | H04L 65/4084 709/231 |
| 2014/0258552 A1* | 9/2014 | Oyman | H04N 19/146 709/231 |
| 2014/0281002 A1* | 9/2014 | Sun | H04L 29/06455 709/231 |
| 2015/0023404 A1* | 1/2015 | Li | H04L 65/4084 375/240.02 |
| 2015/0088965 A1* | 3/2015 | Pakulski | H04N 21/2387 709/203 |
| 2015/0288617 A1 | 10/2015 | Dasher et al. | |
| 2015/0288965 A1* | 10/2015 | Li | H04N 19/124 375/240.03 |
| 2015/0312301 A1 | 10/2015 | Dasher et al. | |
| 2015/0350276 A1 | 12/2015 | Karlsson et al. | |
| 2016/0028647 A1 | 1/2016 | Ramakrishnan et al. | |
| 2016/0088054 A1 | 3/2016 | Hassan et al. | |
| 2016/0100345 A1* | 4/2016 | Thangarasa | H04L 5/00 370/332 |
| 2016/0105728 A1 | 4/2016 | Schmidmer et al. | |
| 2016/0205162 A1* | 7/2016 | Zhang | H04L 65/601 709/231 |
| 2016/0212054 A1* | 7/2016 | Howard | H04L 65/608 |
| 2016/0241626 A1 | 8/2016 | Parthasarathy | |
| 2016/0277475 A1* | 9/2016 | Lee | H04L 65/80 |
| 2016/0337680 A1* | 11/2016 | Kalagi | H04N 21/2662 |
| 2017/0055012 A1 | 2/2017 | Phillips et al. | |
| 2017/0064342 A1* | 3/2017 | Botsford | H04N 21/23439 |
| 2018/0020036 A1 | 1/2018 | Ramamurthy et al. | |
| 2018/0176615 A1 | 6/2018 | Hannu et al. | |
| 2018/0191796 A1 | 7/2018 | Gandhi et al. | |
| 2018/0199100 A1 | 7/2018 | Fujii et al. | |
| 2018/0241836 A1* | 8/2018 | Arsenault | H04L 67/2847 |
| 2018/0309809 A1 | 10/2018 | Sen et al. | |
| 2018/0338146 A1* | 11/2018 | John | H04N 19/14 |
| 2019/0327510 A1* | 10/2019 | Kalagi | H04L 65/4092 |

OTHER PUBLICATIONS

Huang, T.-Y. et al., A buffer-based approach to rate adaptation: Evidence from a large video streaming service. In Proc. of ACM SIGCOMM, pp. 187-198, 2014., Aug. 17, 2014-Aug. 22, 2014, pp. 1-14.

Nam, Hyunwoo, "QoE Matters More Than QoS: Why People Stop Watching Cat Videos", INFOCOM 2016—The 35th Annual IEEE International Conference on Computer Communications, IEEE, 2016, 9 pages.

Spiteri, Kevin et al., "BOLA: Near-Optimal Bitrate Adaptation for Online Videos", INFOCOM 2016—The 35th Annual IEEE International Conference on Computer Communications, IEEE, Apr. 12, 2016, pp. 1-12.

Wikipedia, "Cumulative Distribution Function", https://en.wikipedia.org/wiki/Cumulative_distribution_function, Jul. 7, 2018, 6 pages.

Wikipedia, "Mean Squared Error", https://en.wikipedia.org/Mean_squared_error, Jun. 15, 2018, 6 pages.

Wikipedia, "Video Multimethod Assessment Fusion", https://en.wikipedia.org/wiki/Video_Multimethod_Assessment_Fusion, Mar. 9, 2018, 3 pages.

Yin, Xiaoqi et al., "A Control-Theoretic Approach for Dynamic Adaptive Video Streaming Over HTTP", ACM SIGCOMM Computer Communication Review, vol. 45, No. 4, ACM 2015, Aug. 17, 2015-Aug. 21, 2015, pp. 325-338.

Zhang, Tong et al., "Modeling and Analyzing the Influence of Chunk Size Variation on Bitrate Adaptation in DASH", IEEE Infocom 2017—IEEE Conference on Computer Communication, 2017, 9 pages.

Cisco VNI: Global Mobile Data Traffic Forecast Update, 2015-2020. http://www.cisco.com/c/en/us/solutions/collateral/serviceprovider/visual-networking-index-vni/mobile-white-paper-c11-520862.html., 2016, pp. 1-22.

Ctrix Mobile Analytics Report, 2014. https://www.citrix.com/products/bytemobile-adaptive-traffic-management/tech-info.html#reports., Feb. 2015, pp. 1-25.

YouTube live encoder settings, bitrates and resolutions. https://support.google.com/youtube/answer/2853702?hl=en., 2017, pp. 1-3.

Dash-Industry-Forum/dash.js.https://github.com/Dash-Industry-Forum/dash.js., 2017, pp. 1-5.

Best Practices for Creating and Deploying HTTP Live Streaming Media for Apple Devices (Apple Technical Note TN2224). https://developer.apple.com/library/content/technotes/tn2224/ index.html., pp. 1-16, 2016.

Astrom, Karl et al., Feedback Systems: An Introduction for Scientists and Engineers. Princeton University Press, 2008, pp. 1-9.

Chen, Jiasi et al., J. Chen, R. Mahindra, M. A. Khojastepour, S. Rangarajan, and M. Chiang. A scheduling framework for adaptive video delivery over cellular networks. In Proc. of ACM MobiCom., 2013, pp. 1-12.

(56) References Cited

OTHER PUBLICATIONS

Cicco, L. De et al., ELASTIC: a client-side controller for dynamic adaptive streaming over HTTP (DASH). In Proc. of Packet Video Workshop (PV). IEEE., 2013, pp. 1-8.
Cicco, L.D. et al., Feedback control for adaptive live video streaming. In Proc. of ACM MMSys., Feb. 23, 2011, pp. 1-12.
Dobrian, F. et al., Understanding the impact of video quality on user engagement. ACM CCR, 41(4)., Aug. 15, 2011, pp. 1-12.
Jiang, J. et al., Improving fairness, efficiency, and stability in http-based adaptive video streaming with FESTIVE. In Proc. of ACM CoNEXT, 2012, pp. 97-108.
Krishnan, S. S. et al., Video stream quality impacts viewer behavior: inferring causality using quasi-experimental designs. IEEE/ACM Transactions on Networking, Nov. 14, 2012, pp. 1-14.
Li, Z. et al., Probe and adapt: Rate adaptation for http video streaming at scale. IEEE JSAC, 32(4), Jul. 7, 2013, pp. 1-15.
Liu, Y. et al., Deriving and validating user experience model for DASH video streaming. IEEE Transactions on Broadcasting, 61(4)., Dec. 2015, pp. 651-665.
McClamroch, N.H., State Models of Dynamic Systems: A Case Study Approach. Springer, Jan. 1980, pp. 1-257.
Ni, Pengpeng et al., Flicker effects in adaptive video streaming to handheld devices. In Proc. of ACM Multimedia, 2011, pp. 1-10.
Ogata, K., Modern Control Engineering. Prentice Hall, 2010, pp. 1-905.
Tian, G., Towards agile and smooth video adaptation in dynamic HTTP streaming. In Proc. of ACM CoNEXT, 2012, pp. 1-12.
Xie, X. et al., piStream: physical layer informed adaptive video streaming over LTE. In Proc. of ACM MobiCom, 2015, pp. 1-13.
Zou, X. et al., Can accurate predictions improve video streaming in cellular networks? In Proc. of HotMobile, 2015, pp. 1-6.

\* cited by examiner

218

224

240

241

242

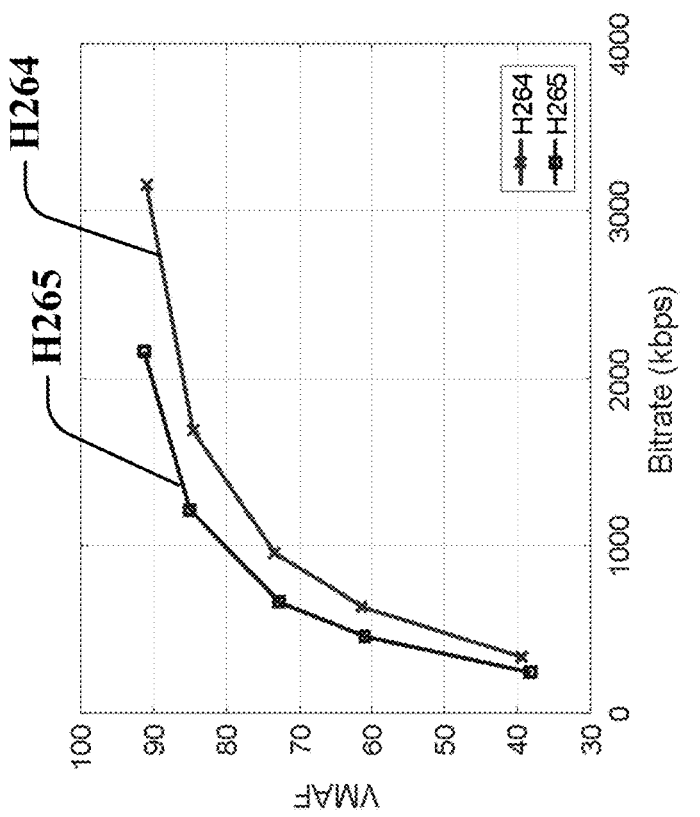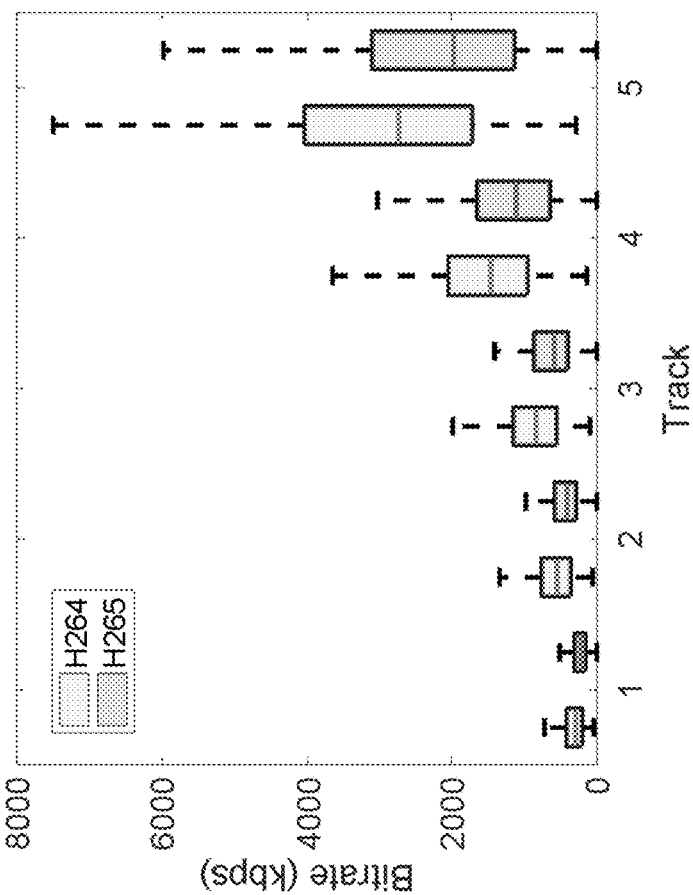
FIG. 2S

252

253

254

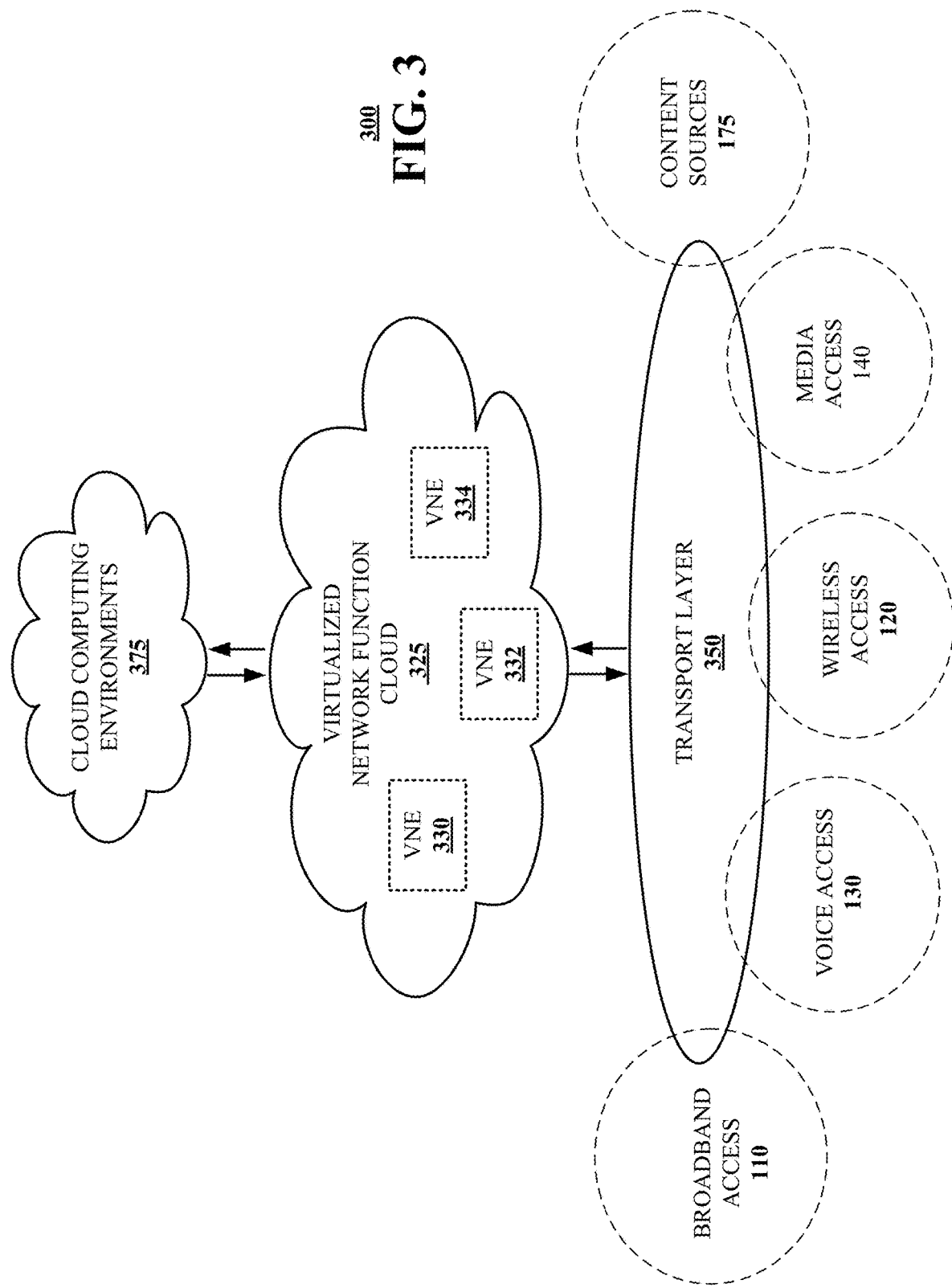

APPARATUS, STORAGE MEDIUM AND METHOD FOR ADAPTIVE BITRATE STREAMING ADAPTATION OF VARIABLE BITRATE ENCODINGS

FIELD OF THE DISCLOSURE

The subject disclosure relates to an apparatus, storage medium and method for adaptive bitrate (ABR) streaming adaptation of variable bitrate (VBR) encodings.

BACKGROUND

Online video streaming is continuing its explosive growth. As per Cisco's 2016 Visual Network Index report, mobile video traffic (as of the date of that report) accounts for more than half of all mobile data traffic. Despite a number of recent innovations, ensuring good user Quality of Experience (QoE) over wireless networks such as cellular remains technically challenging, due to the variable network conditions inherent in such environments. Adaptive Bitrate (ABR) streaming (specifically HTTP Live Streaming (HLS) and Dynamic Adaptive Streaming over HTTP (DASH)) has emerged as the de facto streaming technology for dynamically adapting the video streaming quality based on varying network conditions. At the video server, a video is compressed into multiple independent streams (or tracks), each specifying the same content but with different bitrate/quality. A track is further divided into a series of chunks, each containing data for a few seconds' worth of playback. During playback, the adaptation logic at the client determines, for any playback position in the video, which quality chunk to fetch based on the prevailing network conditions. The playback involves a mix of chunks from different tracks for different parts of the video. Due to the extremely high bandwidth requirements, digital video typically has to be compressed before being sent over the network. The video compression used for a track can be: (1) Constant Bitrate (CBR)—attempts to encode the entire video at a relatively fixed bitrate by varying the quantization parameter (and hence the quality) across different scenes; or (2) Variable Bitrate (VBR)—encodes simple scenes (i.e., low-motion or low-complexity scenes) with fewer bits and complex scenes (i.e., high-motion or high-complexity scenes) with more bits, while maintaining a more consistent quality throughout the track. VBR presents some key advantages over CBR: for instance, the ability to realize better video quality for the same average bitrate, or lower bitrate encoding than CBR for the same equivalent quality. Traditionally, only CBR was mainly deployed, partly due to various practical difficulties including the complex encoding pipelines for VBR, as well as the demanding storage, retrieval, and transport challenges posed by the multi-timescale bitrate burstiness of VBR videos. Only fairly recently have content providers begun adopting VBR encoding, spurred by the promise of substantial improvements in the quality-to-bits ratio compared to CBR, and by technological advancements in VBR encoding pipelines.

Two conventional efforts that develop ABR adaptation schemes for VBR videos rely on optimizing traditional QoE metrics defined for CBR videos, and also suffer from performance degradations including large amounts of re-buffering and/or significant viewing quality changes (see Huang, Te-Yuan, et al. "A buffer-based approach to rate adaptation: Evidence from a large video streaming service." *ACM SIGCOMM Computer Communication Review* 44.4 (2015): 187-198 and Zhang, Tong, et al. "Modeling and analyzing the influence of chunk size variation on bitrate adaptation in DASH." *INFOCOM 2017-IEEE Conference on Computer Communications, IEEE*. IEEE, 2017). The techniques of this Huang reference are sometimes referred to herein as "BBA1" or "BBA-1" and the techniques of this Zhang reference are sometimes referred to herein as "RBA".

BRIEF DESCRIPTION OF THE DRAWINGS

Reference will now be made to the accompanying drawings, which are not necessarily drawn to scale, and wherein.

Graph 216 shows a call-out to a representative point "A" from the top portion of the scale on the right-hand side; graph 216 shows a call-out to a representative point "B" from the middle portion of the scale on the right-hand side, and graph 216 shows a call-out to a representative point "C" from the bottom portion of the scale on the right-hand side.

Figure 2A:
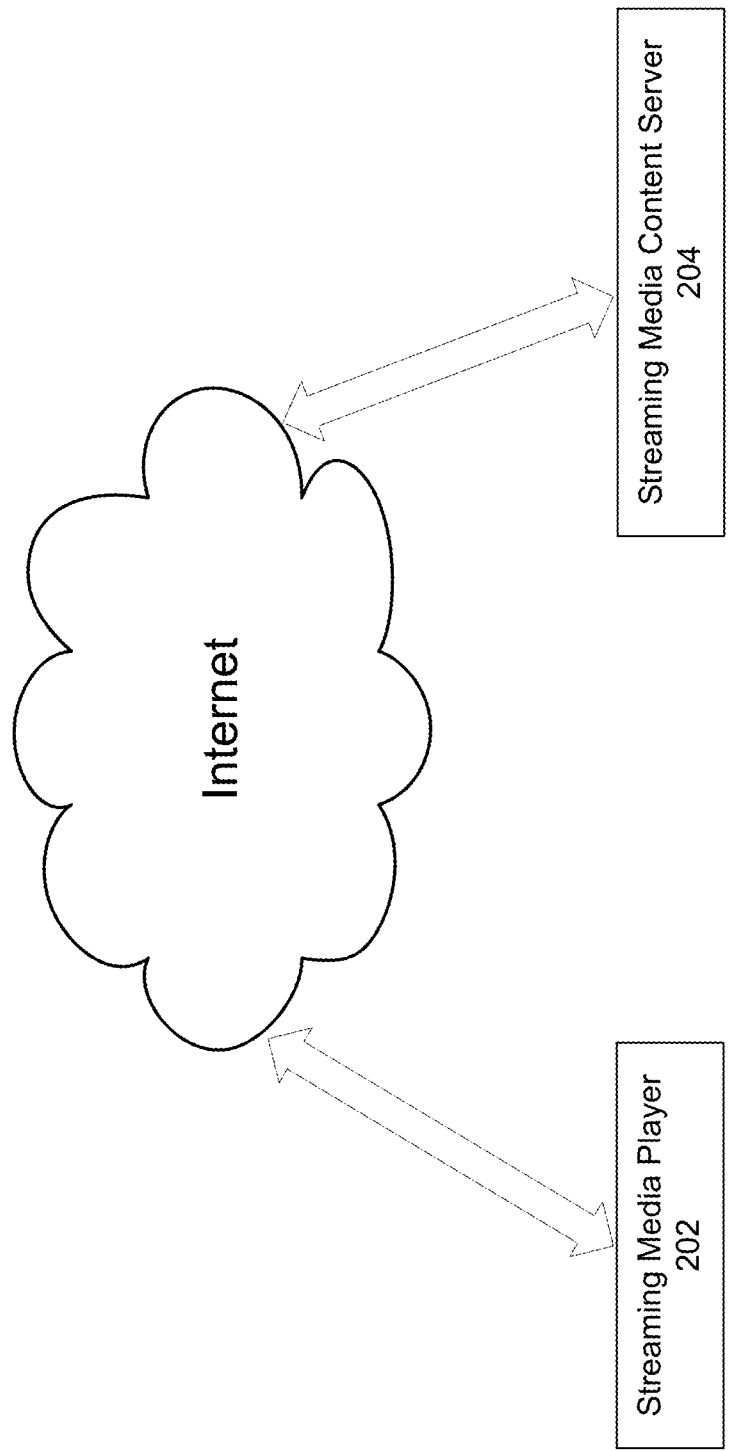
FIG. 2A is a block diagram illustrating an example, non-limiting embodiment of a system 200 functioning within the system 100 of FIG. 1 in accordance with various aspects described herein.
Figure 2B:
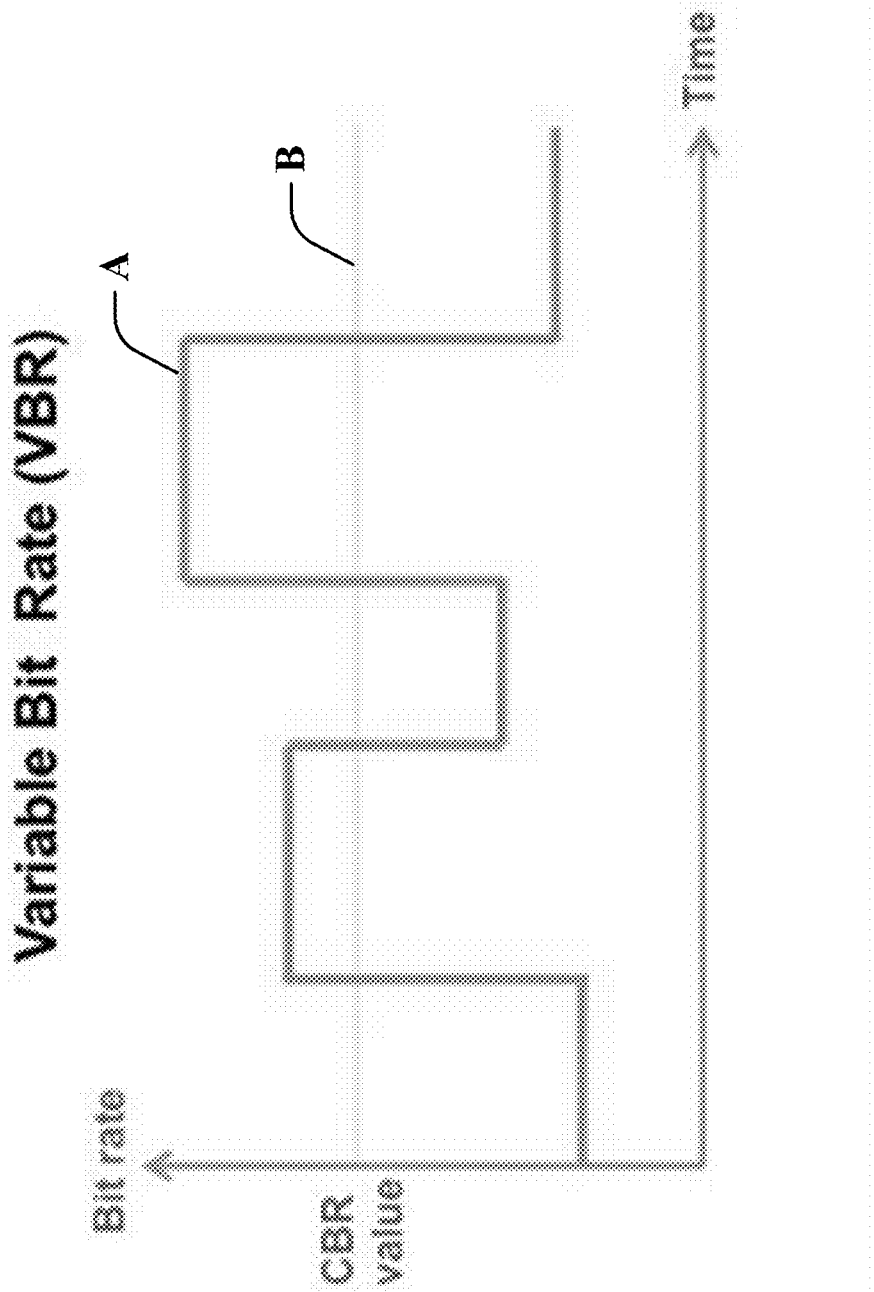
FIG. 2B is a graph 210 illustrating an example of a variable bitrate (shown as the time-varying line "A") compared to a constant bitrate (shown as the horizontal line "B") in accordance with various aspects described herein (in this graph, time is on the x-axis and bitrate is on the y-axis). A VBR typically produces better quality-to-bits ratio compared to CBR.
Figure 2C:
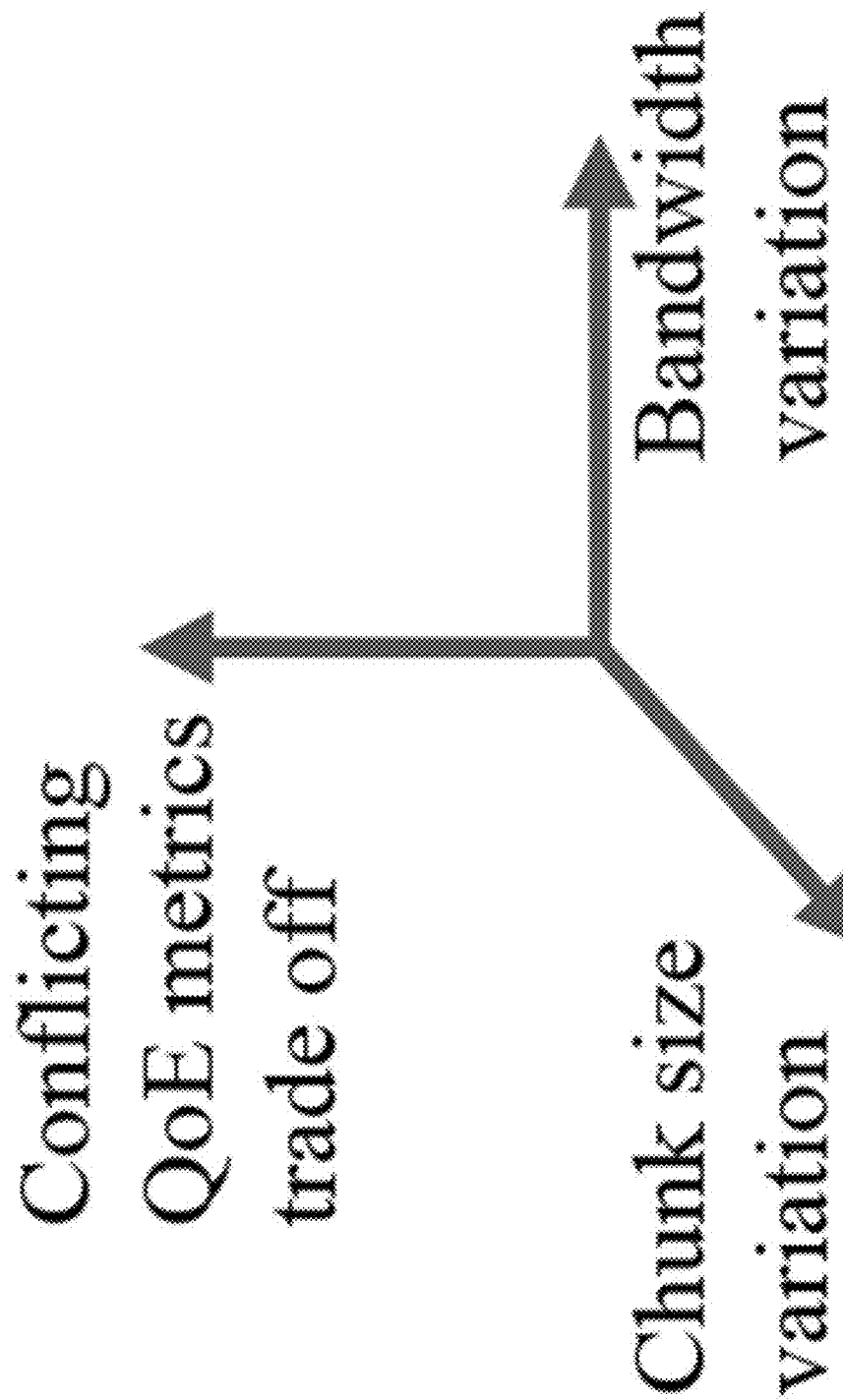
FIG. 2C is a graph 212 illustrating an example of certain challenges associated with use of VBR in accordance with various aspects described herein. For example, there are challenges regarding selection of proper QoE metrics (the QoE metrics developed for CBR cannot typically be used for VBR). Further, VBR presents an additional dimension of tradeoffs regarding chunk size variability.
Figure 2D:
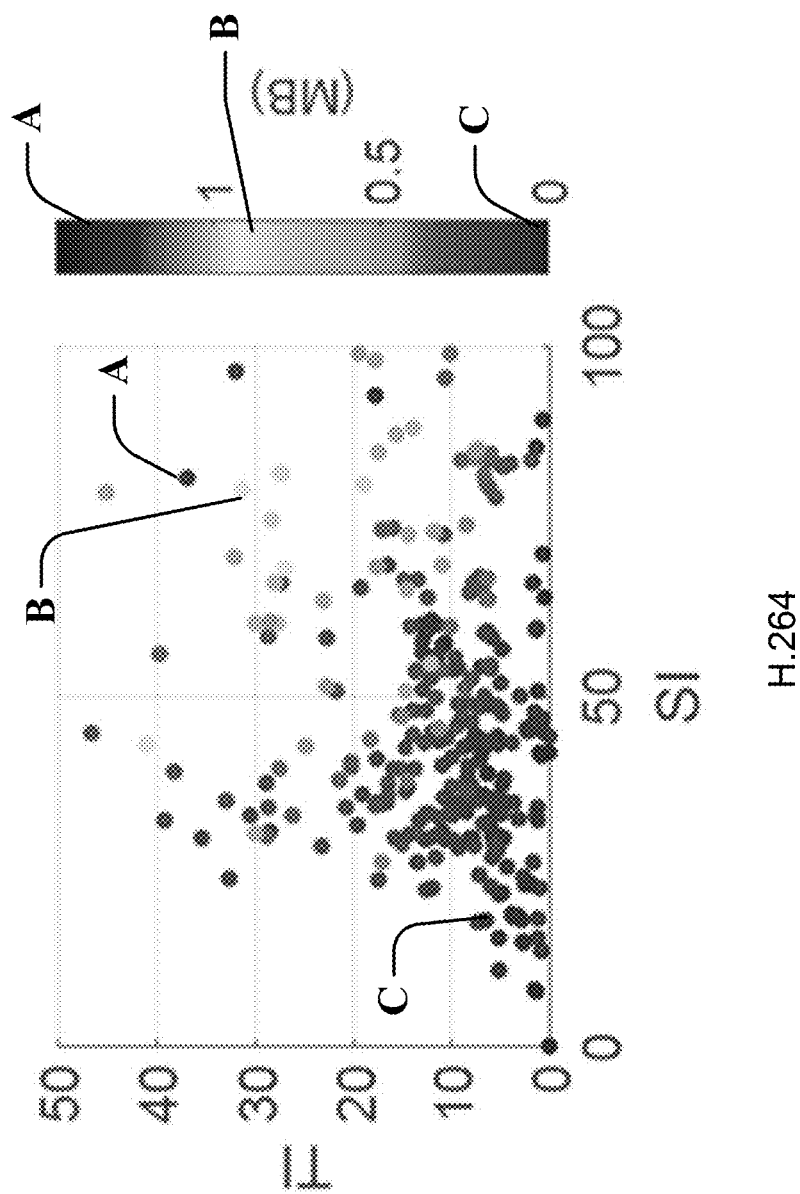
FIGS. 2D and 2E are graphs 214 and 216 respectively illustrating examples of certain VBR video characteristics in accordance with various aspects described herein. In each of these graphs the x-axis is SI (spatial information) and the y-axis is TI (temporal information). These graphs relate in particular to relationships between SI, TI and chunk size for the chunks in Track 3 of Elephant Dream. Graph 214 corresponds to H.264 and graph 216 corresponds to H.265. Graphs 214 and 216 show that chunk size is a good indicator of scene complexity—larger chunk has more spatial information (SI) and temporal information (TI) information, and vice versa with regard to a smaller chunk. Graph 214 shows a call-out to a representative point "A" from the top portion of the scale on the right-hand side; graph 214 shows a call-out to a representative point "B" from the middle portion of the scale on the right-hand side, and graph 214 shows a call-out to a representative point "C" from the bottom portion of the scale on the right-hand side.
Figure 2E:
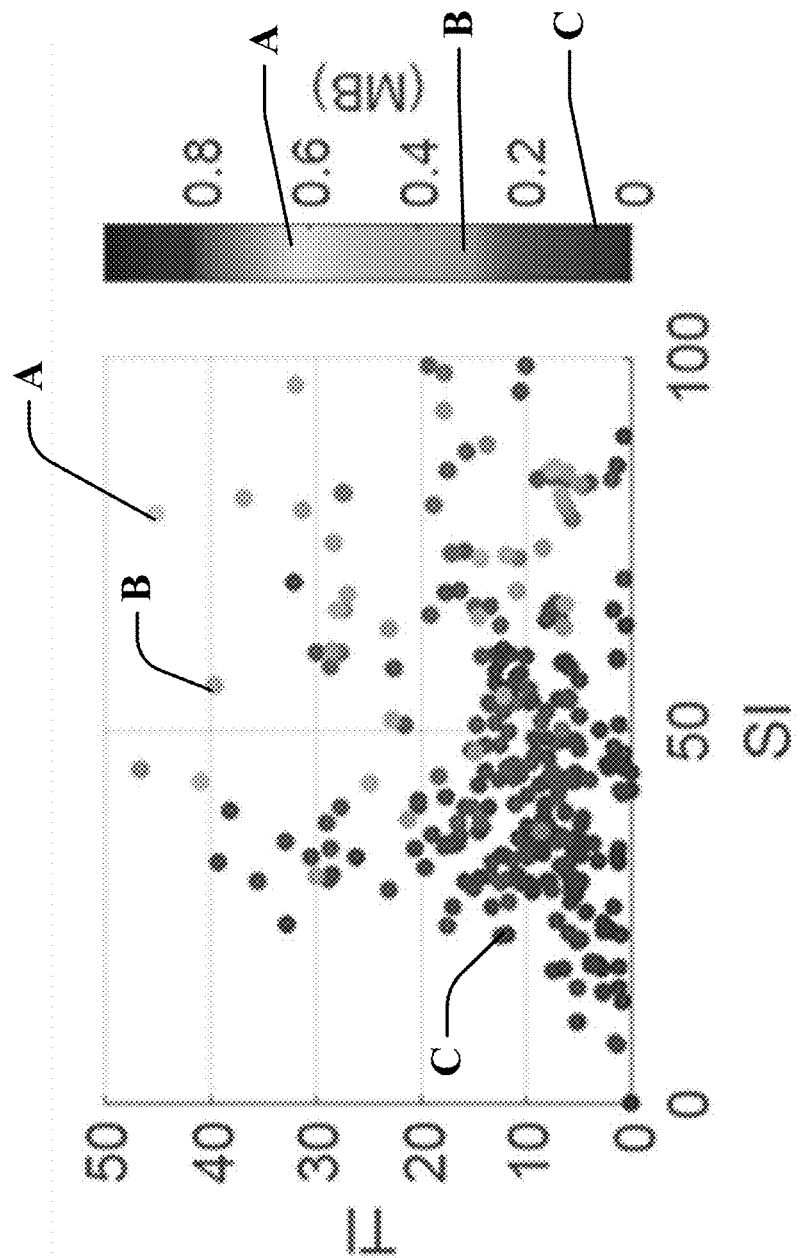
Figure 2F:
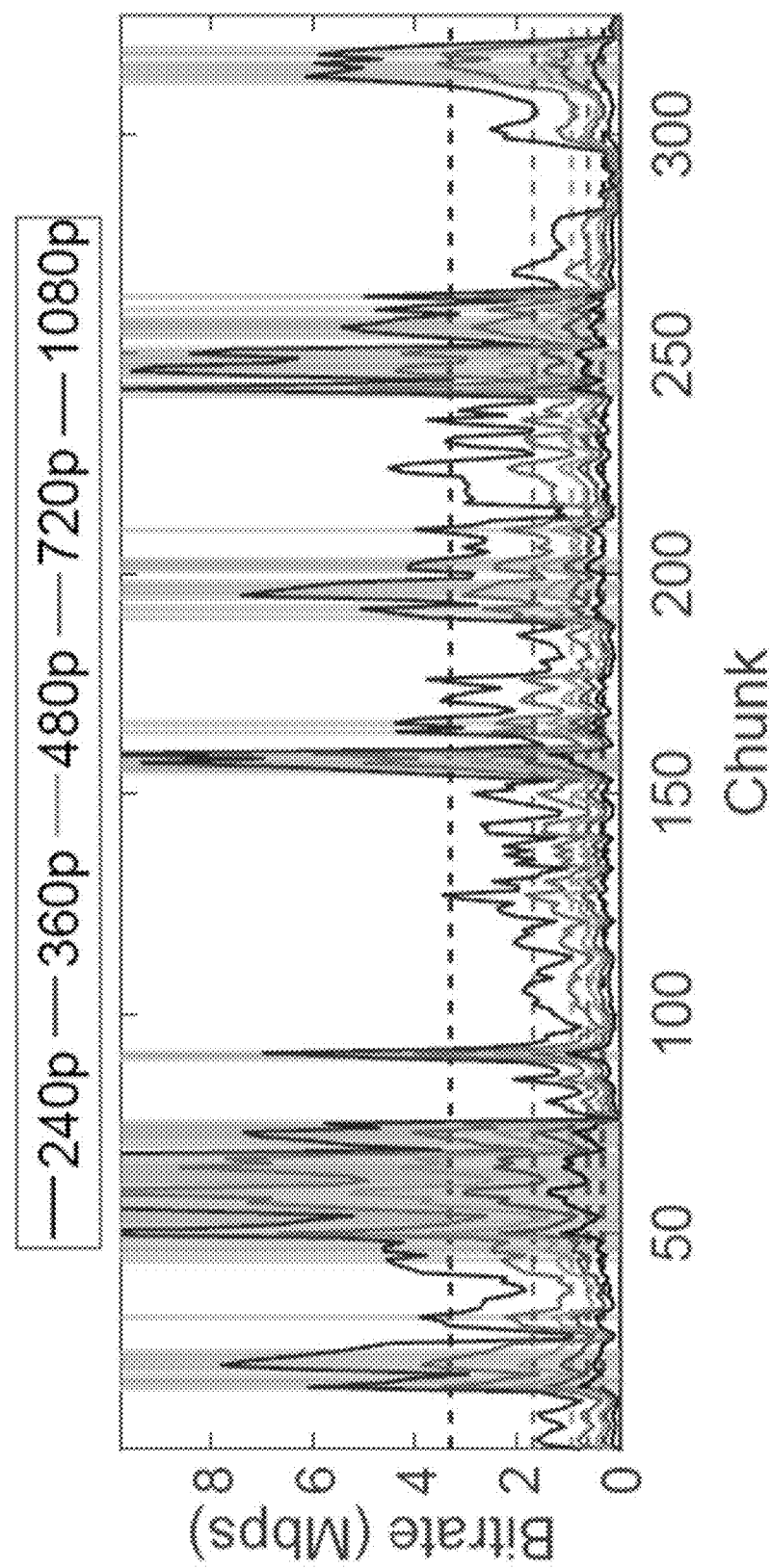

FIG. 2F is a graph 218 illustrating examples of certain VBR video characteristics in accordance with various aspects described herein. In this graph the x-axis is chunk and the y-axis is bitrate (Mbps). This graph relates in particular to bitrate of the chunks of a VBR video (Elephant Dream Encoded by H.264). Plots are shown for 240p, 360p, 480p, 720p and 1080p. Graph 218 shows that scene complexity is consistent among different tracks—a chunk that is relatively large/small in one track is also relatively large/small in another track.

Figure 2G:
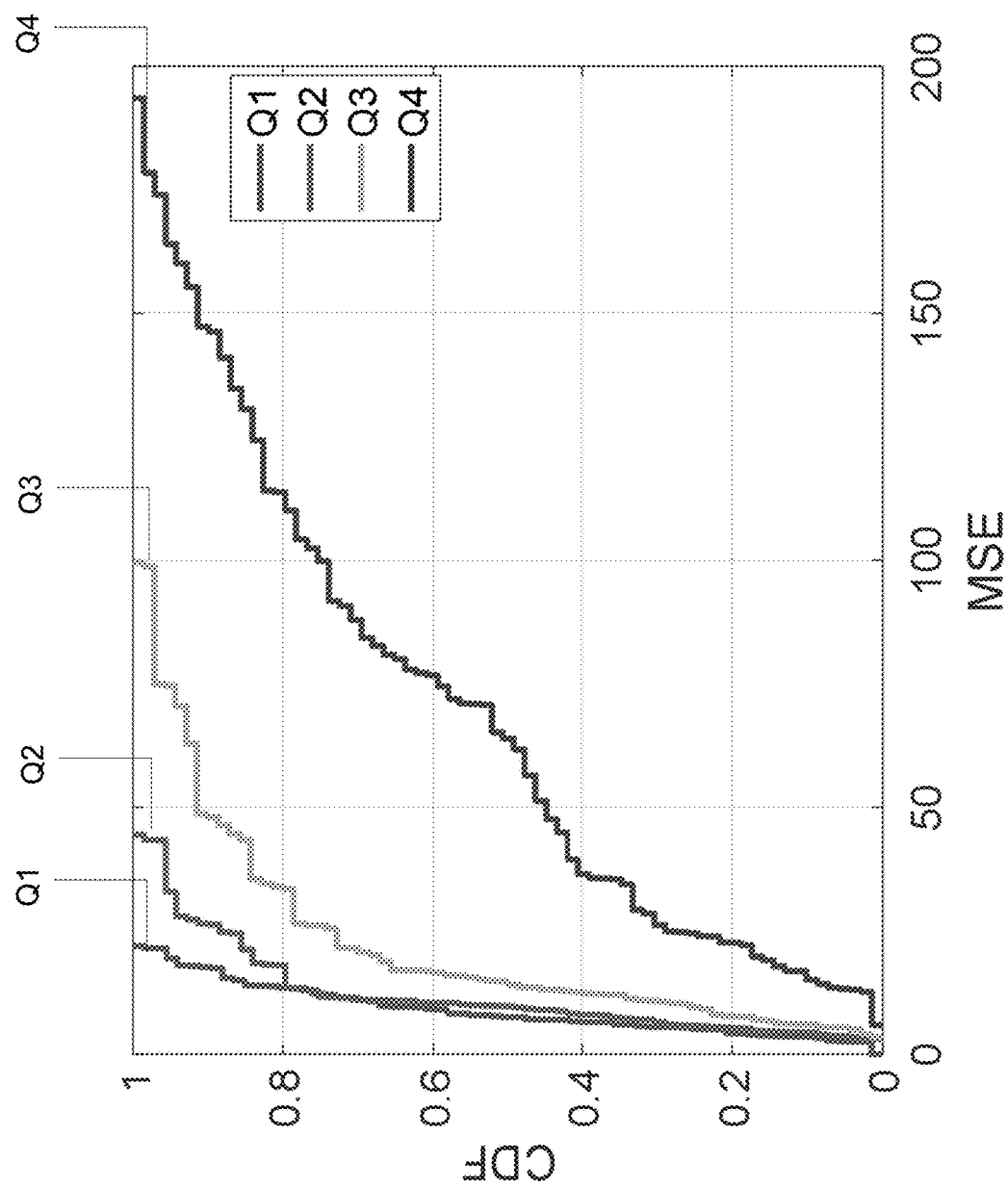
Figure 2H:
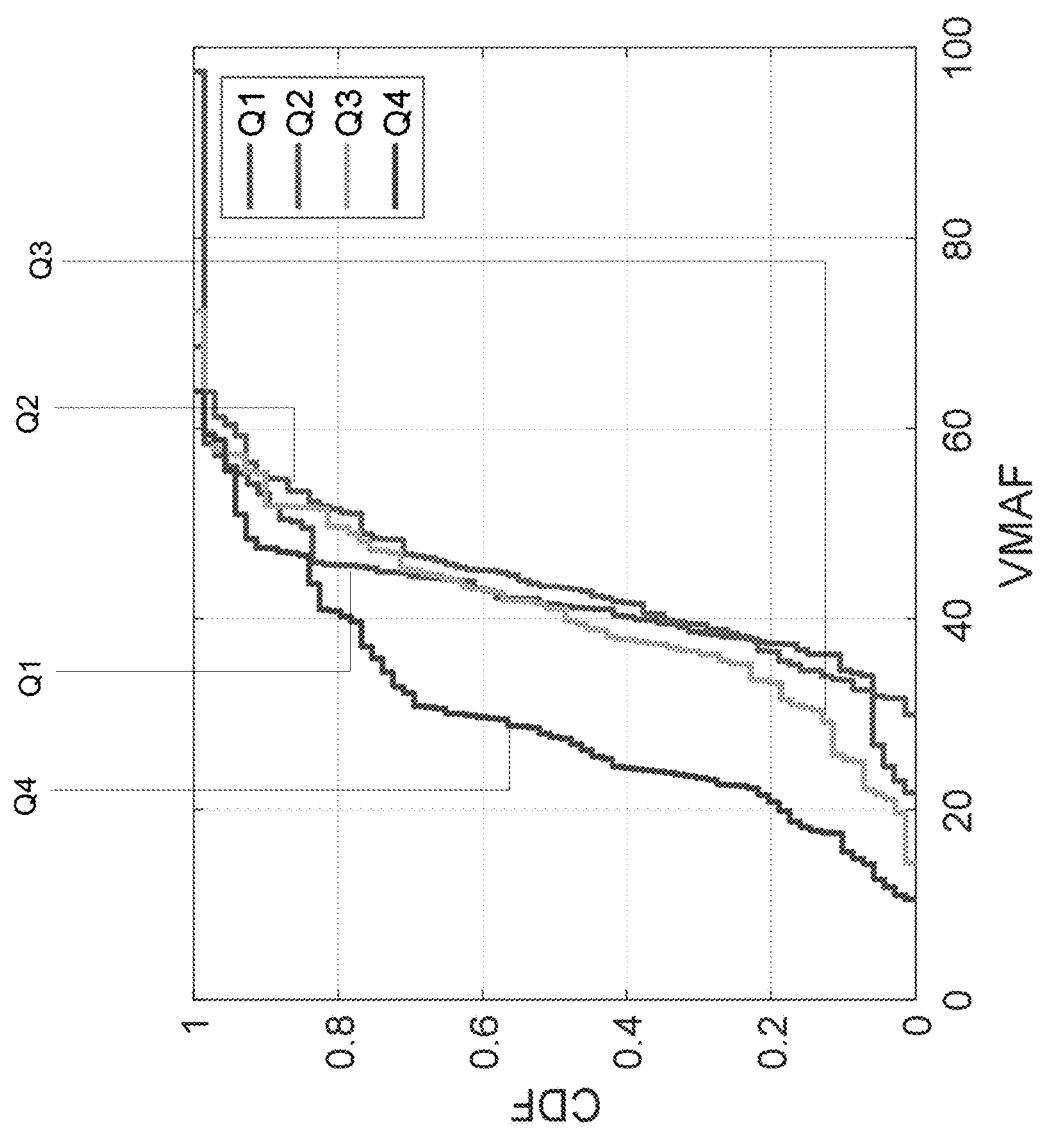

FIGS. 2G and 2H are graphs 220 and 222 respectively illustrating examples of how and why various scenes are considered differently in accordance with various aspects described herein. In graph 220 the x-axis is Mean Squared Error (MSE) and the y-axis is Cumulative Distribution Function (CDF). In graph 222 the x-axis is Video Multi-Method Assessment Fusion (VMAF) and the y-axis is CDF. In these graphs 220 and 222, the MSE and VMAF (respectively) of chunks from different quartiles in track 1 (Big buck bunny with H.264 VBR encoding) are shown. As seen in these graphs 220 and 222, in ABR video streaming, the different scene complexity should be considered for rate adaptation. For example, humans typically care more about the important part of a video (typically corresponding to complex scenes) than simple scenes. Further, there is typically low quality for complex scenes even with VBR (e.g., encoding Q4 chunks is challenging (lower quality than simple scene in the same track)).

Figure 2I:
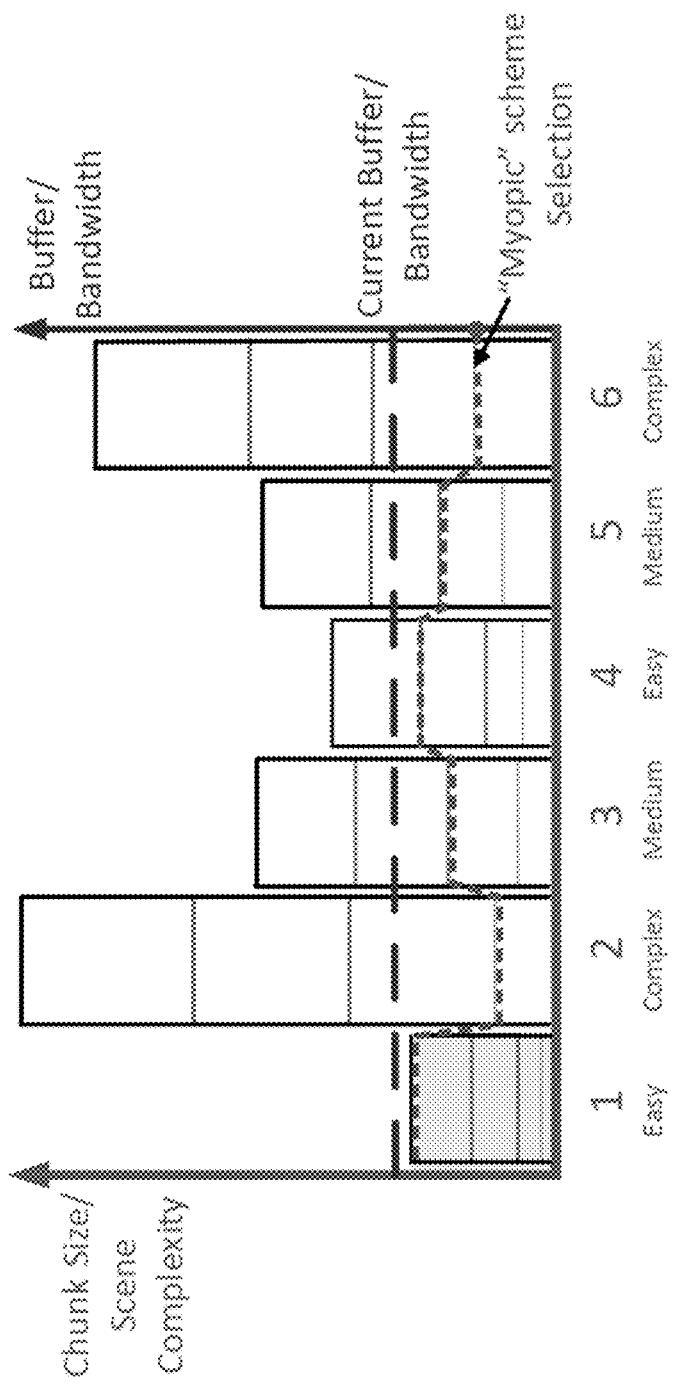

FIG. 2I is a graph 224 illustrating a problem of using a conventional "myopic" scheme for VBR. In this regard, a "myopic" scheme selects level based on current resource, only considering current chunk (e.g., as shown in graph 224, when making a decision for chunk 1, the "myopic" scheme only considers the size of chunk 1, as the shaded part shows). In this graph 224 the VBR video chunks are shown along the x-axis (chunk index) and chunk size/scene complexity is shown along the y-axis. The conventional "myopic" scheme selects high track for easy scene and low track for complex scene.

Figure 2J:
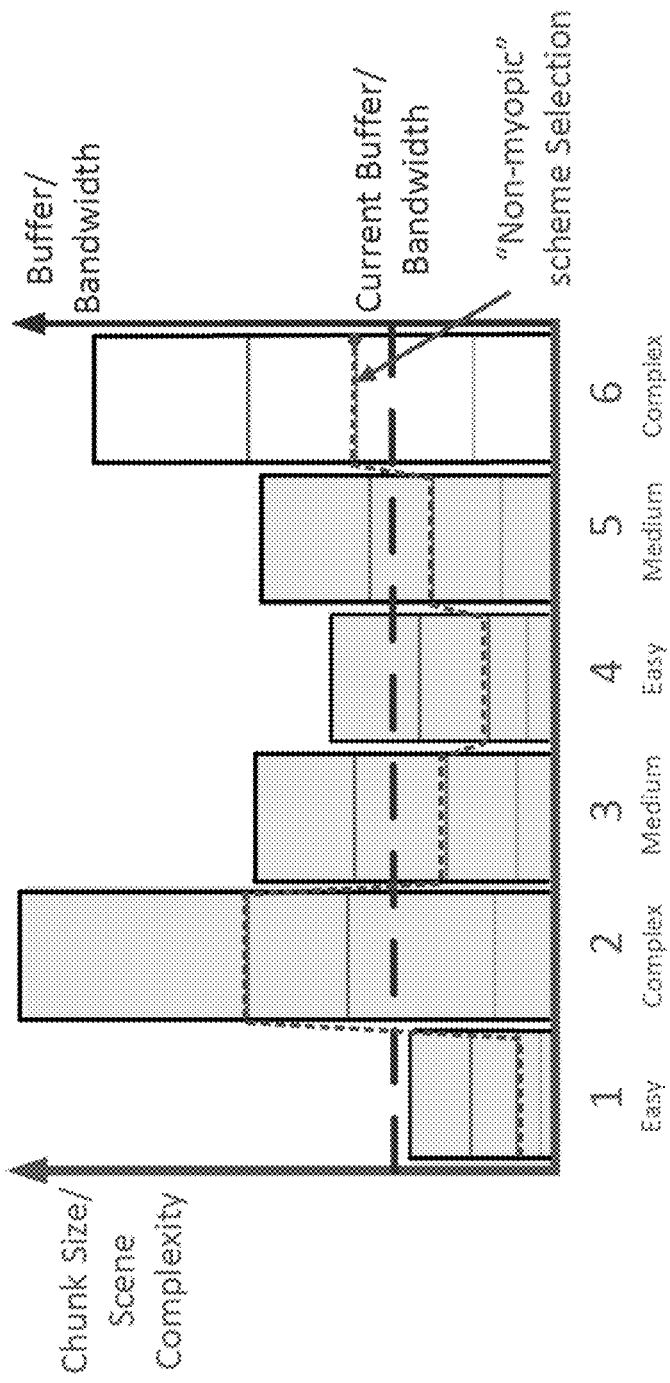

FIG. 2J is a graph 226 illustrating certain design principles for VBR steaming according to an embodiment. In this regard, a "non-myopic" scheme considers not only chunk characteristics at current position, but also those at future chunk positions (e.g., at given time t, consider the sizes of next W chunks). In this graph 226 the VBR video chunks are shown along the x-axis (chunk index) and chunk size/scene complexity is shown along the y-axis. In one specific example, as shown in graph 226, when making a decision for chunk 1, the "non-myopic" scheme considers the size of multiple future chunks, as the shaded parts show). The "non-myopic" scheme of this embodiment selects less "bumpy" levels (e.g., allocate more bits for large chunk (complex scene)).

Figure 2K:
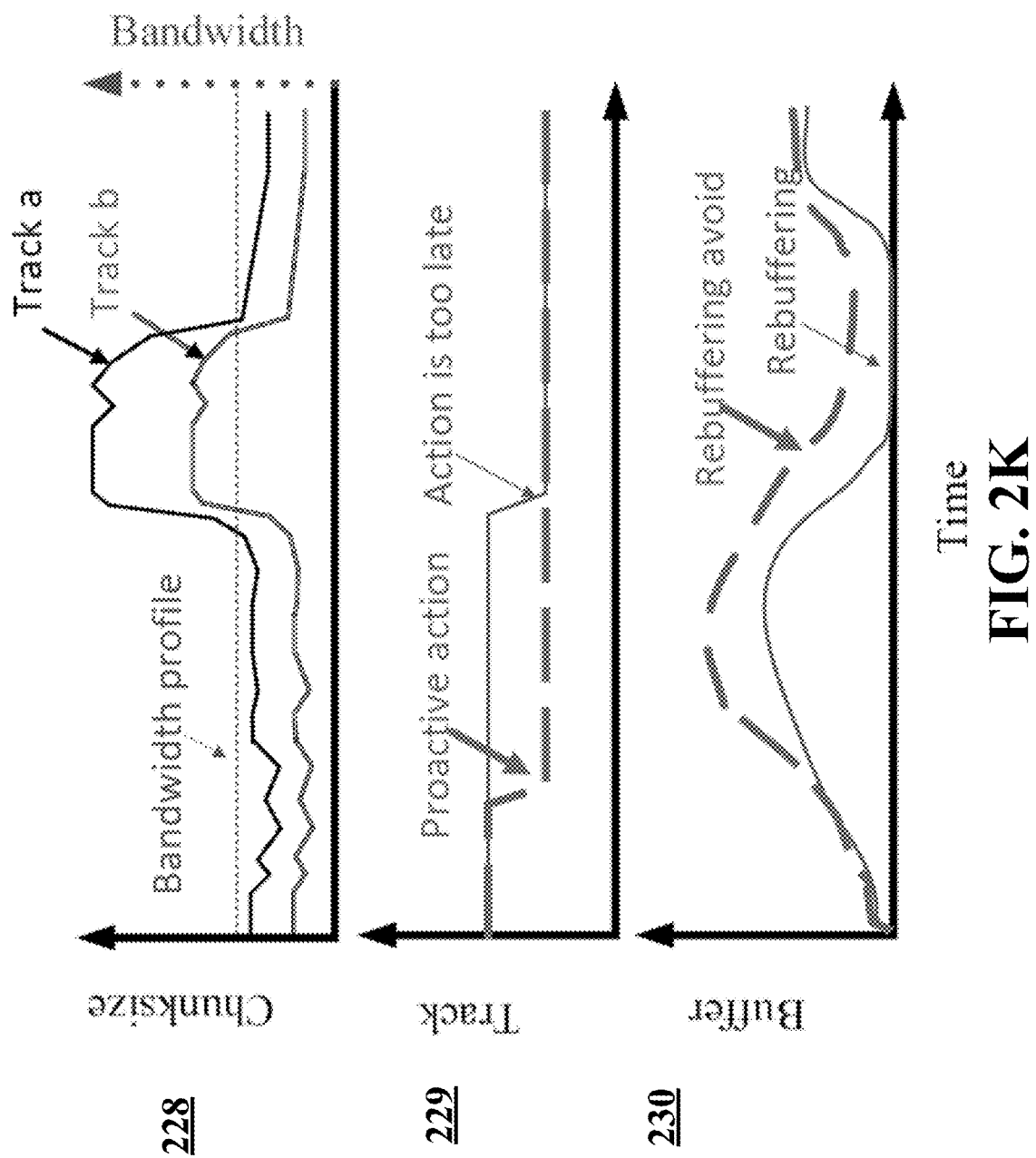

FIG. 2K shows graphs 228, 229 and 230 illustrating certain design principles for VBR videos according to an embodiment. This FIG. 2K shows time (on the x-axis of each of these graphs) vs. Chunk Size (graph 228), Track (graph 229), and Buffer (graph s230) These graphs 228, 229 and 230 further illustrate a proactive aspect of various embodiments: account for the variability proactively; and due to the high bitrate variability in VBR, to take action (e.g., switch the track selection) before it is too late.

Figure 2L:
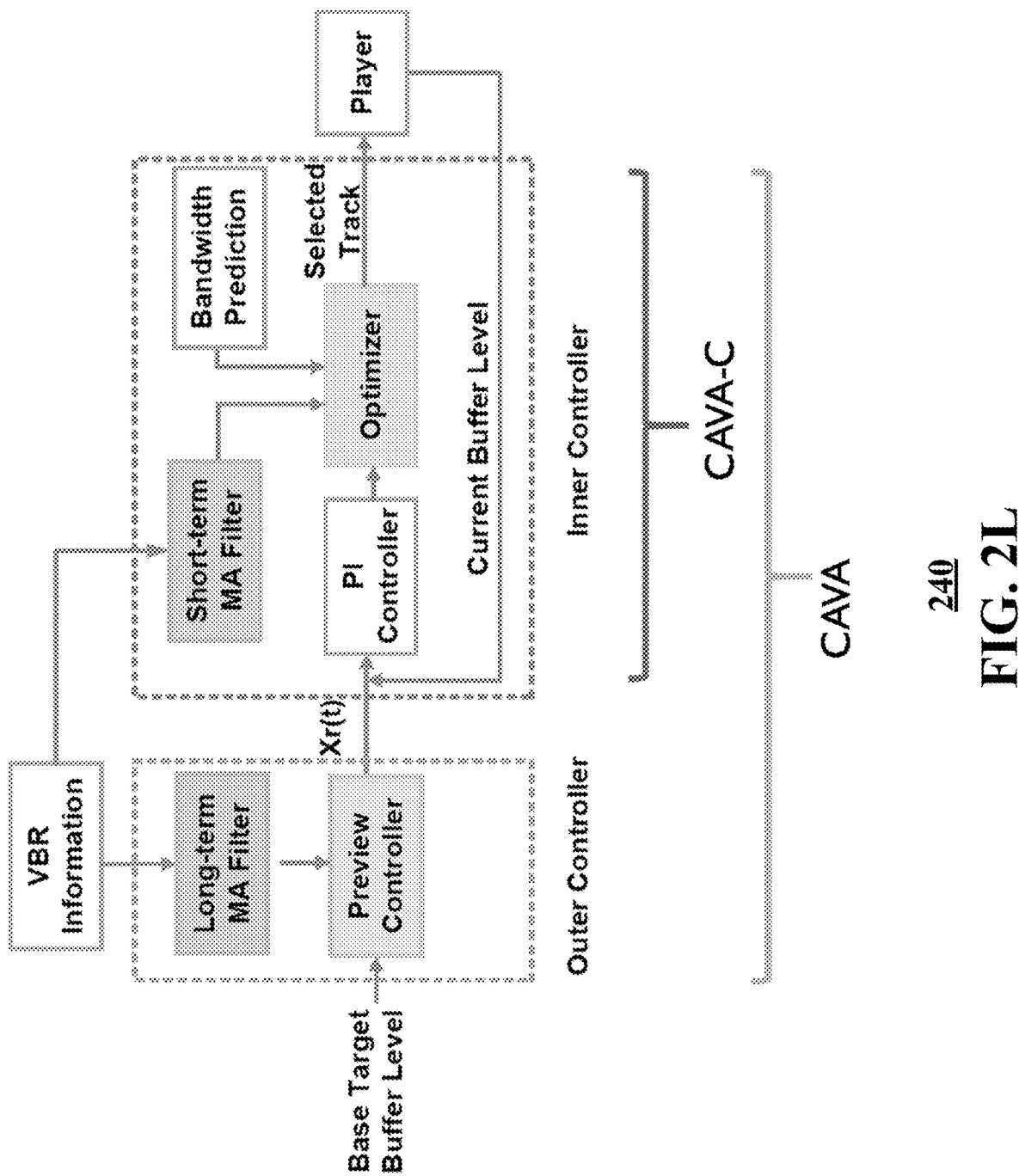

FIG. 2L is a block diagram illustrating an example, non-limiting embodiment sometimes referred to herein as CAVA (Control-theoretic Adaption for VBR-based ABR streaming). In FIG. 2L, the CAVA (which can be implemented, for example, by a streaming media player and/or by a server) includes the Outer Controller and the Inner Controller (sometimes referred to herein as CAVA-C).

Figure 2M:
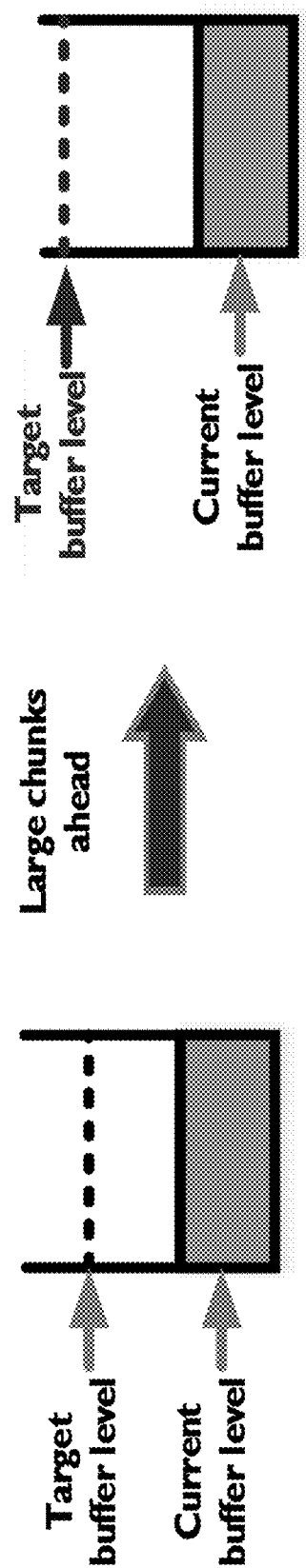

FIG. 2M is a block diagram illustrating an example, non-limiting embodiment in which a target buffer (see the leftmost side of the Fig.) is proactively adjusted (see the middle arrow pointing to the right and then the rightmost side of the Fig.).

Figure 2N:
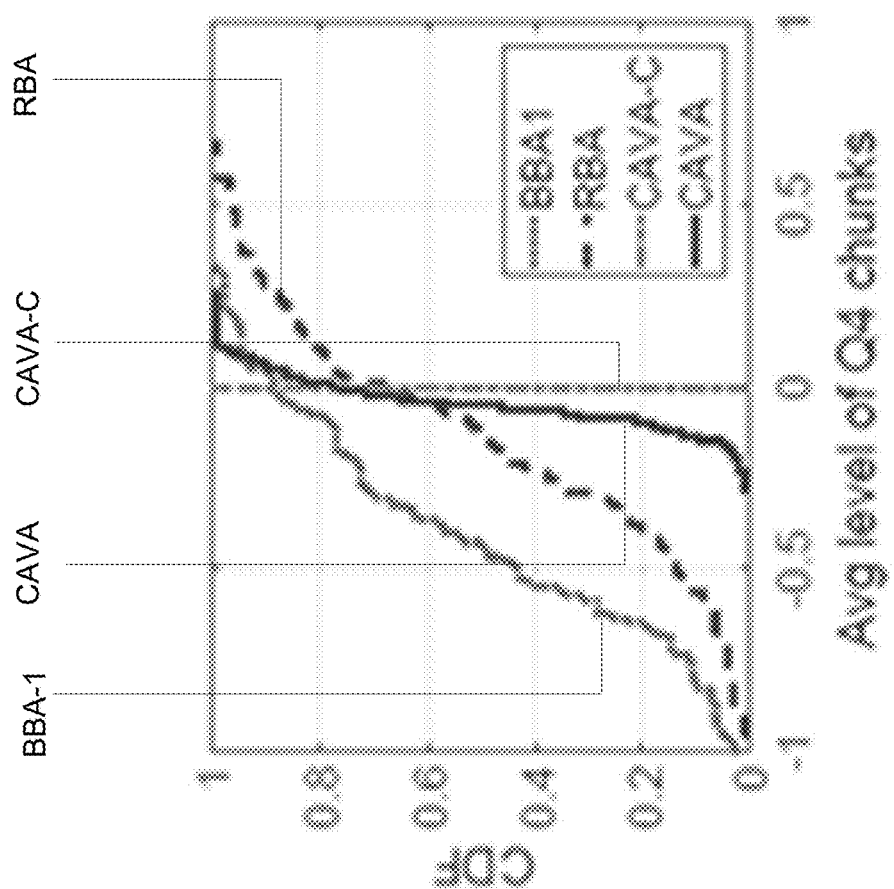
Figure 20:
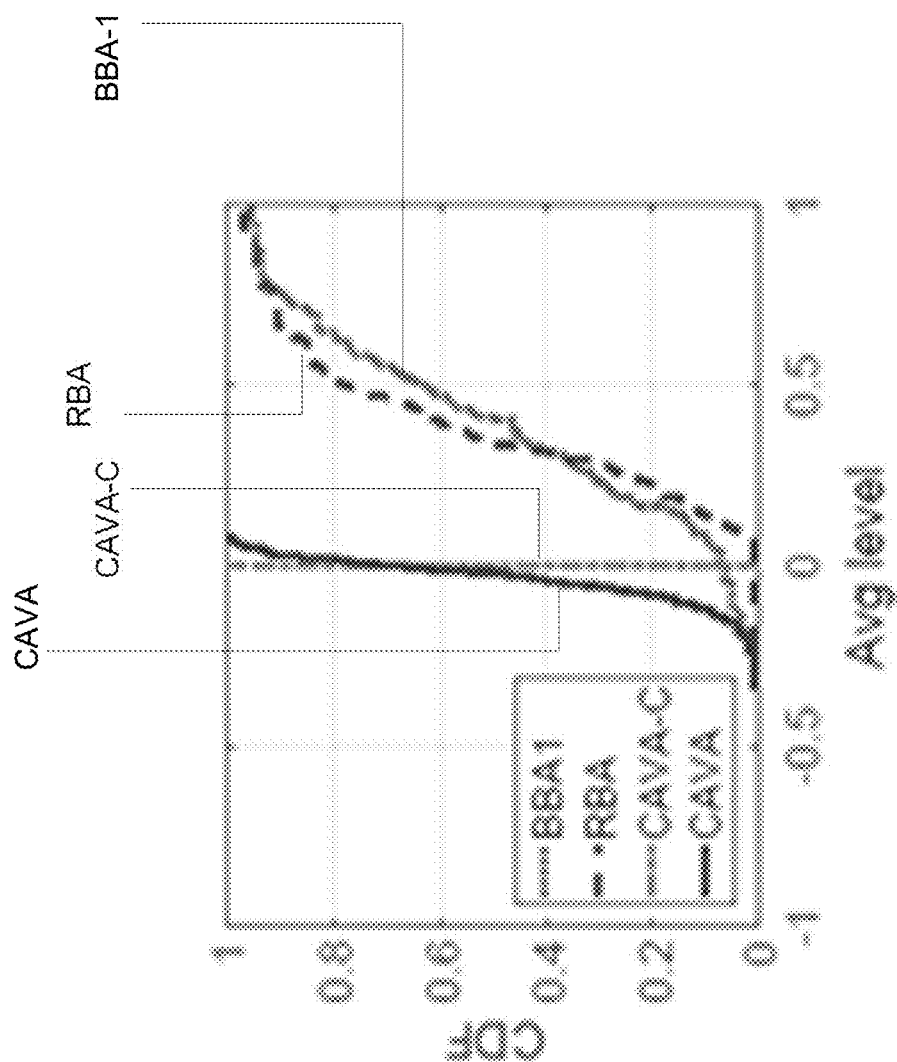
Figure 2P:
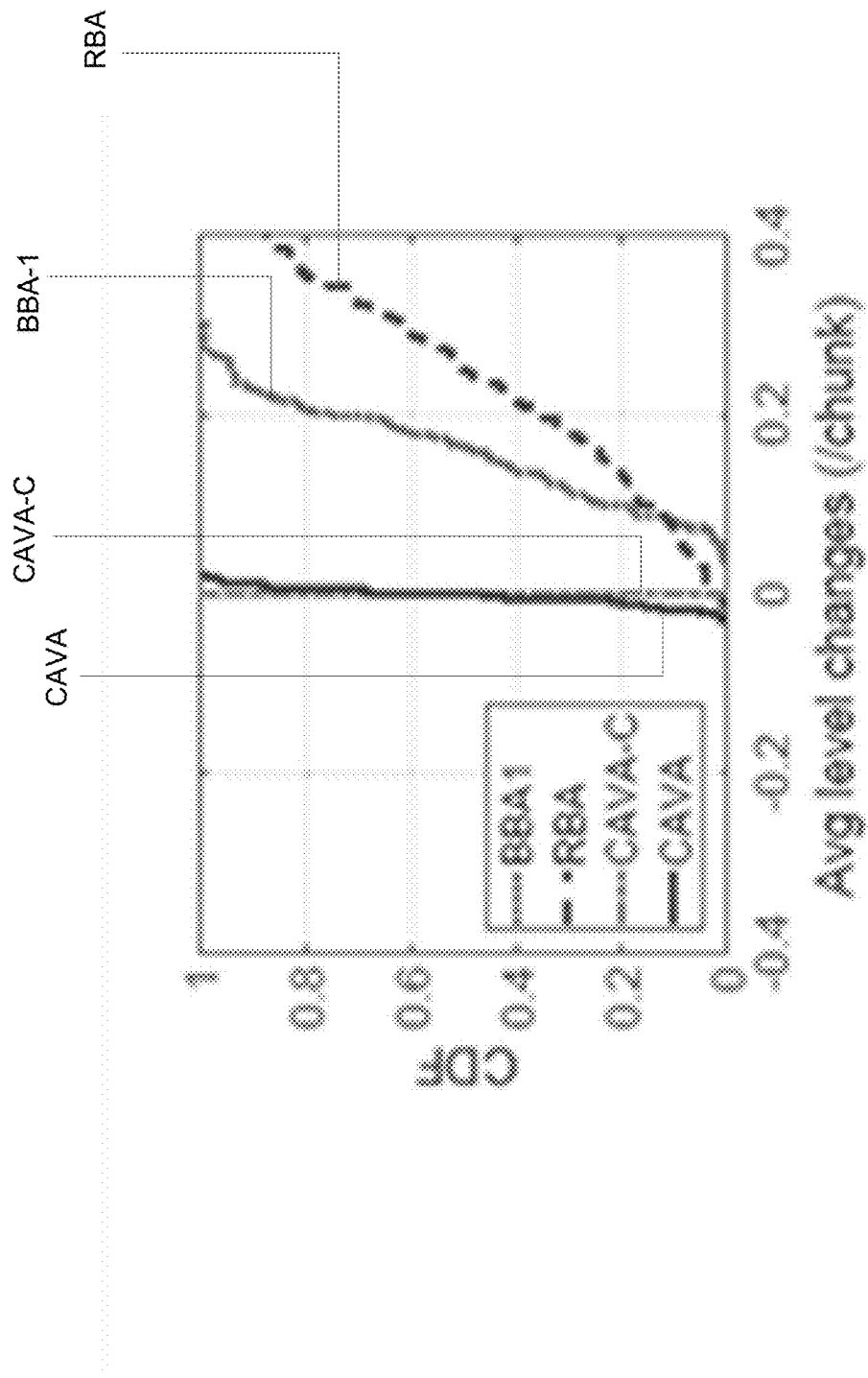
Figure 2Q:
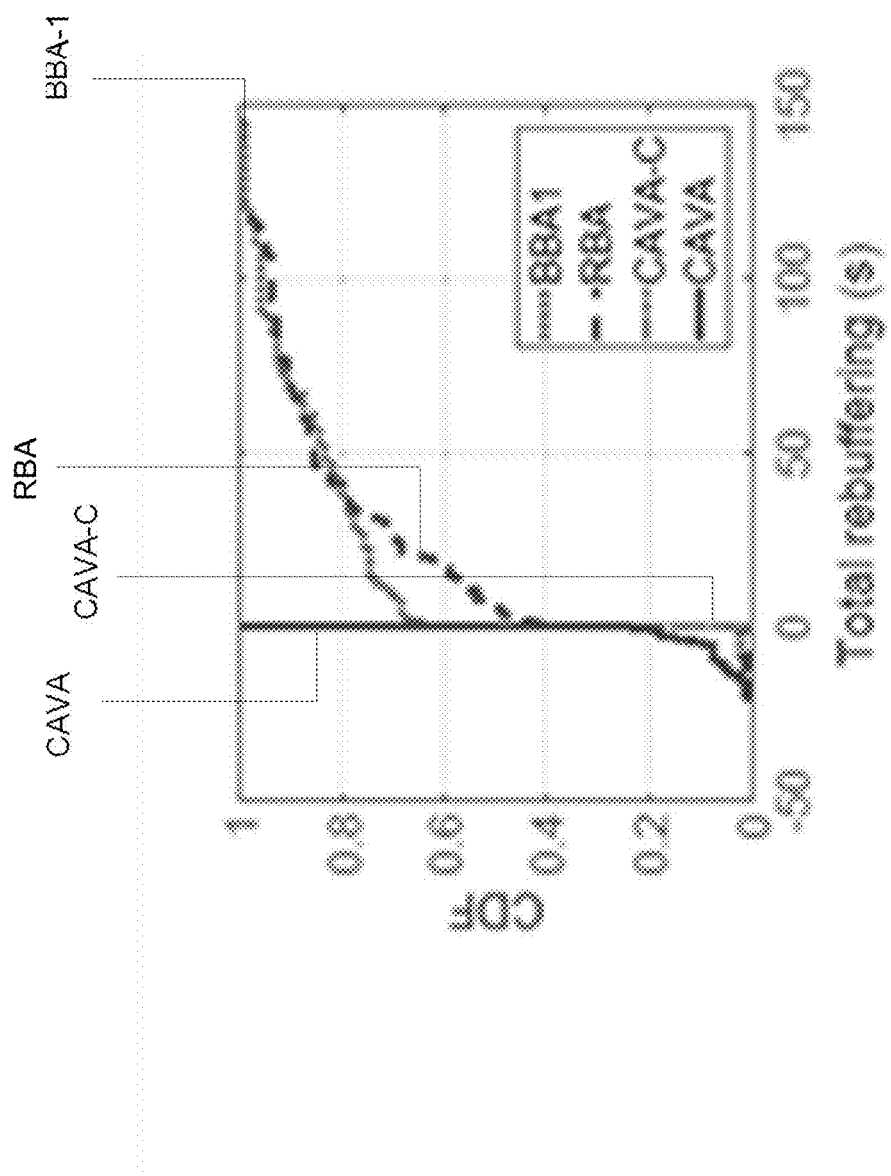

FIGS. 2N-2Q show graphs 242, 243, 244 and 245 illustrating certain performance comparisons between CAVA and BBA1 (see Huang, Te-Yuan, et al. "A buffer-based approach to rate adaptation: Evidence from a large video streaming service." *ACM SIGCOMM Computer Communication Review* 44.4 (2015): 187-198) and RBA (see Zhang, Tong, et al. "Modeling and analyzing the influence of chunk size variation on bitrate adaptation in DASH." *INFOCOM 2017-IEEE Conference on Computer Communications, IEEE*. IEEE, 2017) according to an embodiment. FIG. 2N shows average level of Q4 chunks on the x-axis and CDF on the y-axis; FIG. 2O shows average level on the x-axis and CDF on the y-axis; FIG. 2P shows average level changes (/chunk) on the x-axis and CDF on the y-axis; FIG. 2Q shows total re-buffering (s) on the x-axis and CDF on the y-axis. Each of graphs 242, 243, 244 and 245 relates to Elephant Dream encoded with H.264.

Figure 2R:
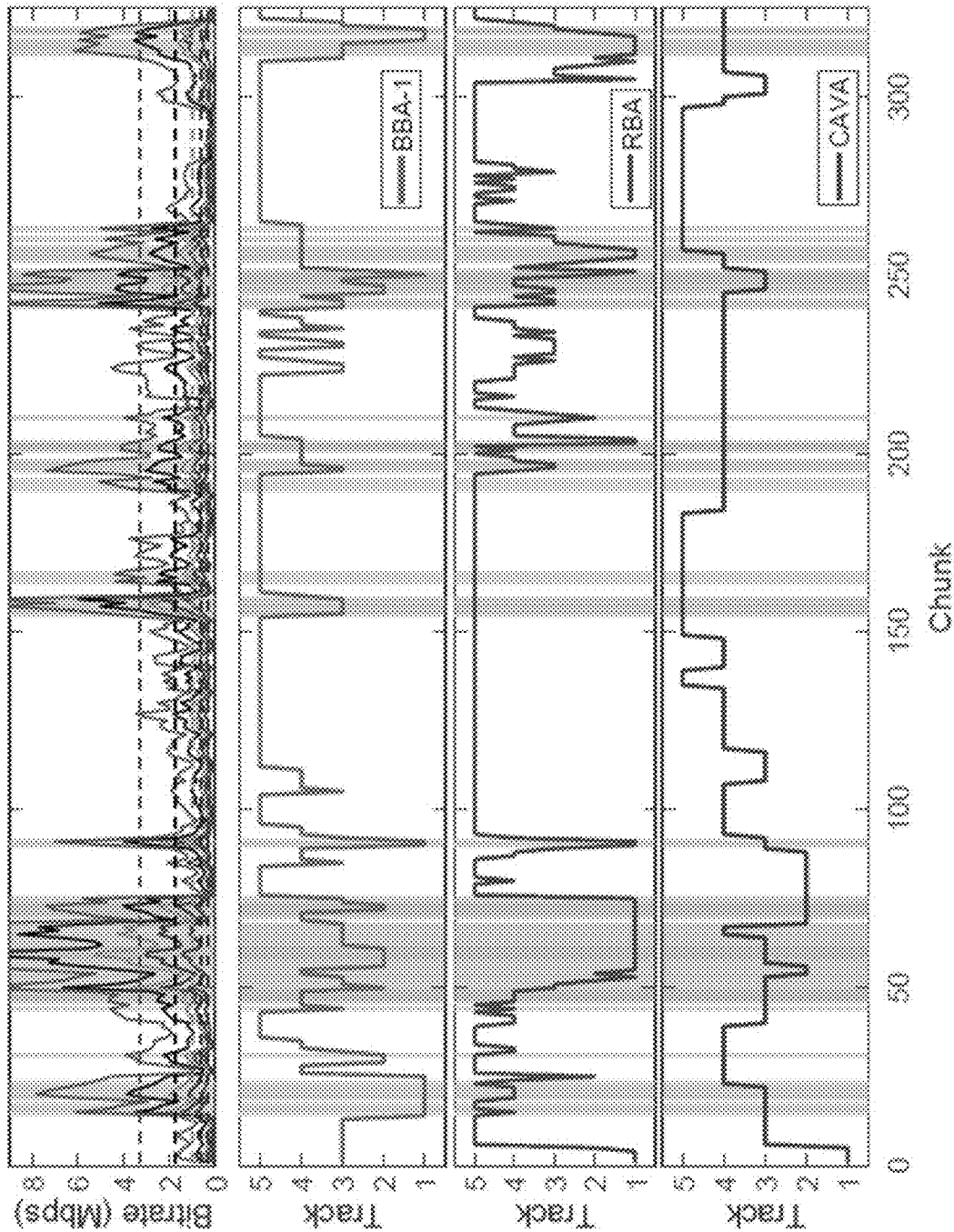

FIG. 2R shows graphs 246, 247, 248 and 249 illustrating that in a case study CAVA according to an embodiment achieves higher quality for high motion scenes. Each of graphs 246, 247, 248 and 249 shows Chunk on the x-axis. Graph 246 shows Bitrate (Mbps) in the y-axis; graph 247 (corresponding to BBA-1) shows Track on the y-axis; graph 248 (corresponding to RBA) shows Track on the y-axis and graph 249 (corresponding to CAVA of an embodiment) shows Track on the y-axis.

FIG. 2S shows graphs 250 and 251 illustrating certain encoding behavior (H265 saves, in this example, over ⅓ bitrate for same quality compared with H264). Graph 250 (a bitrate comparison between H264 and H265 (in VBR)) shows Track on the x-axis and Bitrate (kbps) on the y-axis. In this graph 250, for each of the 5 tracks, H264 is shown as the left element and H265 is shown as the right element). Graph 251 (a rate-quality comparison between H264 and H265 (in VBR)) shows Bitrate (kbps) on the x-axis and VMAF on the y-axis.

Figure 2T:
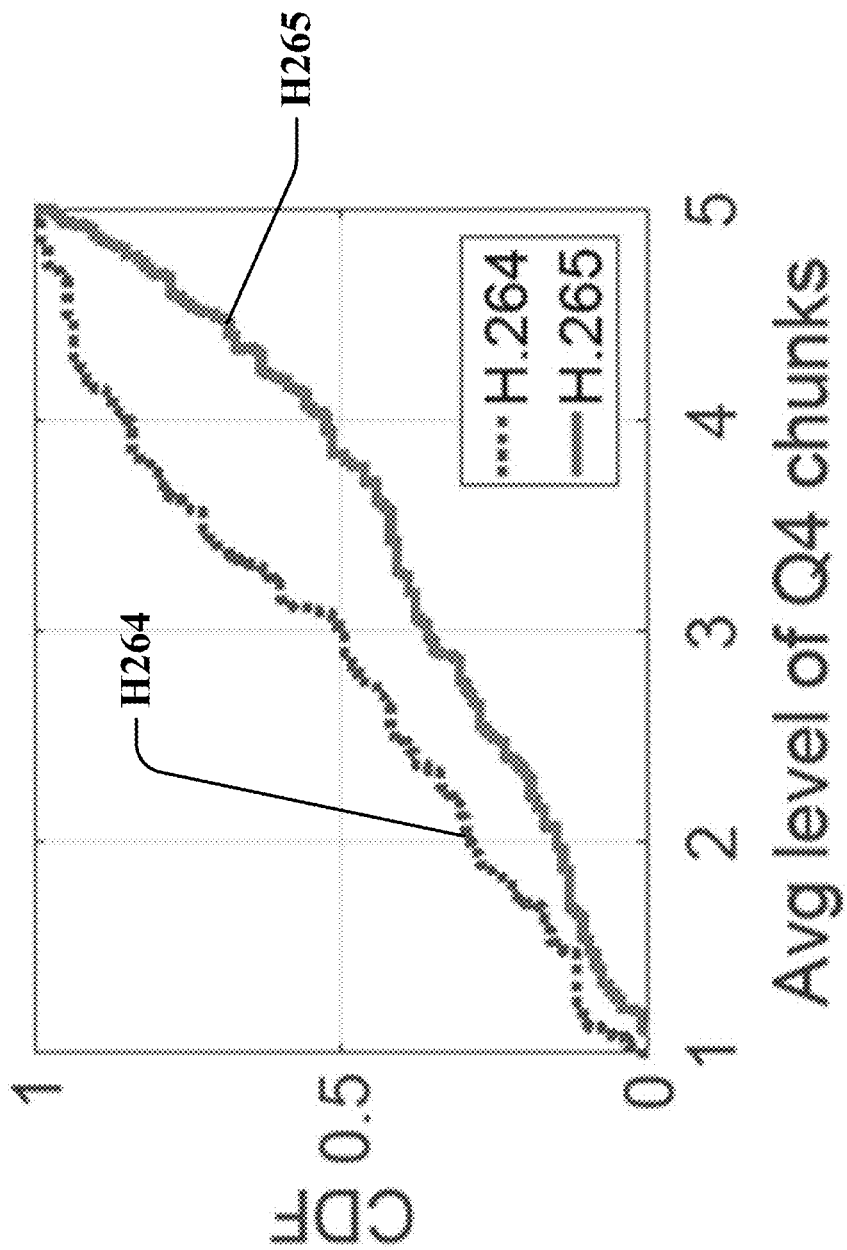
Figure 2U:
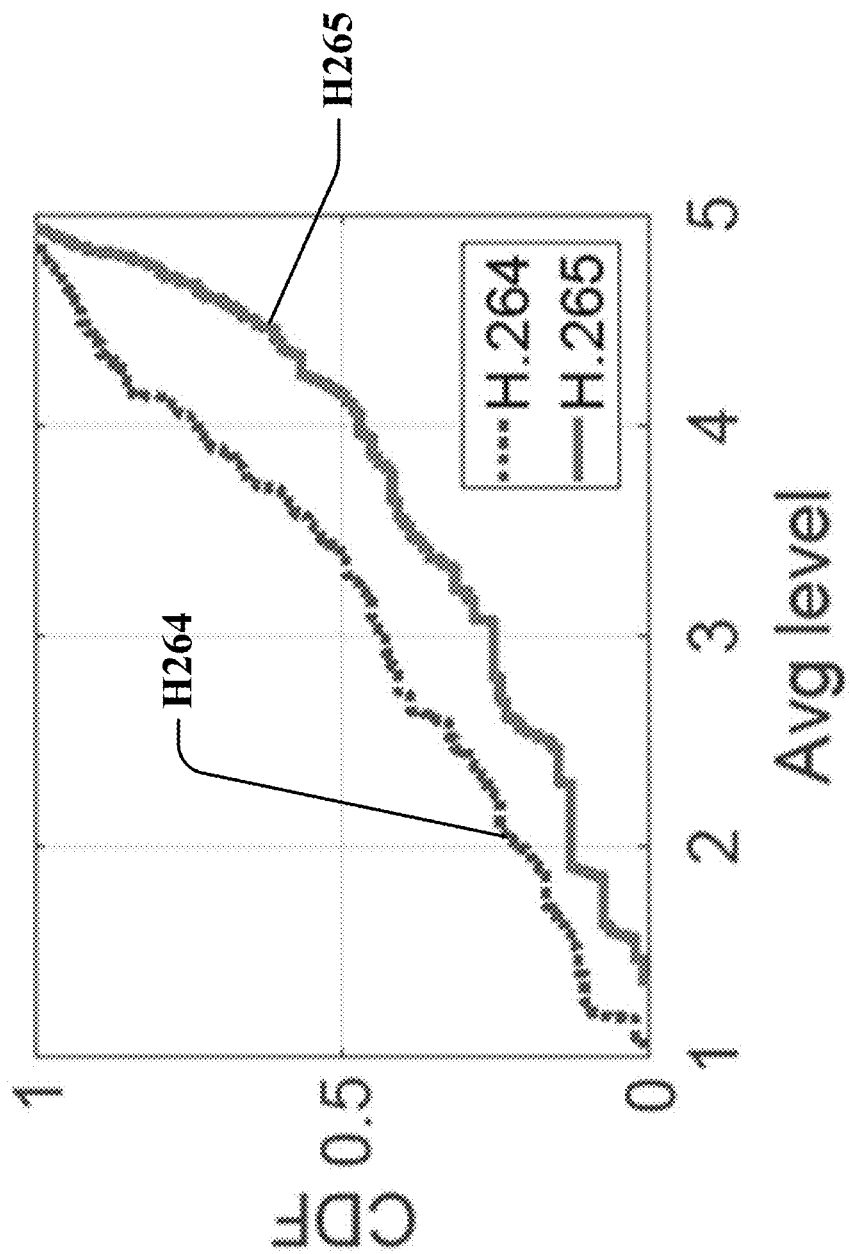
Figure 2V:
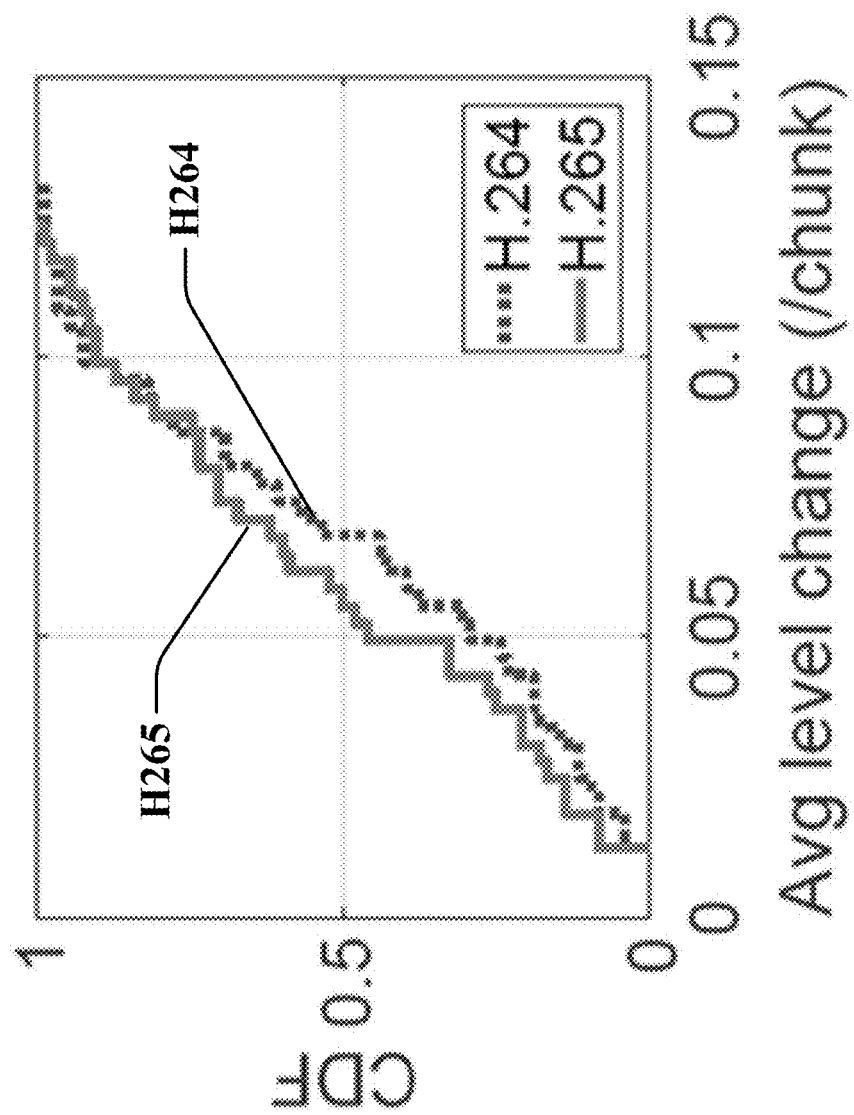
Figure 2W:
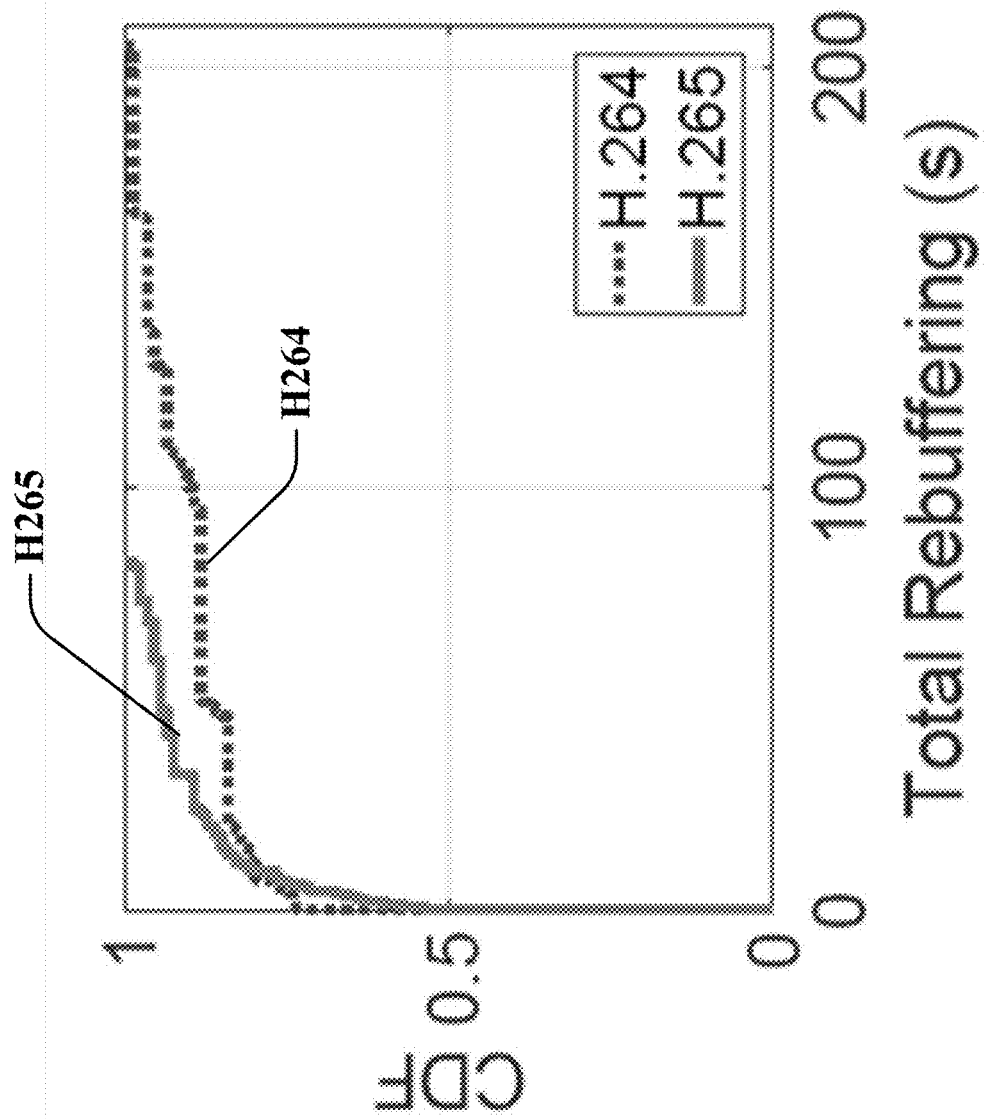

FIGS. 2T-2W show graphs 252, 253, 254 and 255 illustrating certain impact of codec (H264 vs. H265) according to an embodiment. FIG. 2T shows average level of Q4 chunks on the x-axis and CDF on the y-axis; FIG. 2U shows average level on the x-axis and CDF on the y-axis; FIG. 2V shows average level changes (/chunk) on the x-axis and CDF on the y-axis; FIG. 2W shows total re-buffering (s) on the x-axis and CDF on the y-axis.

Figure 2X:
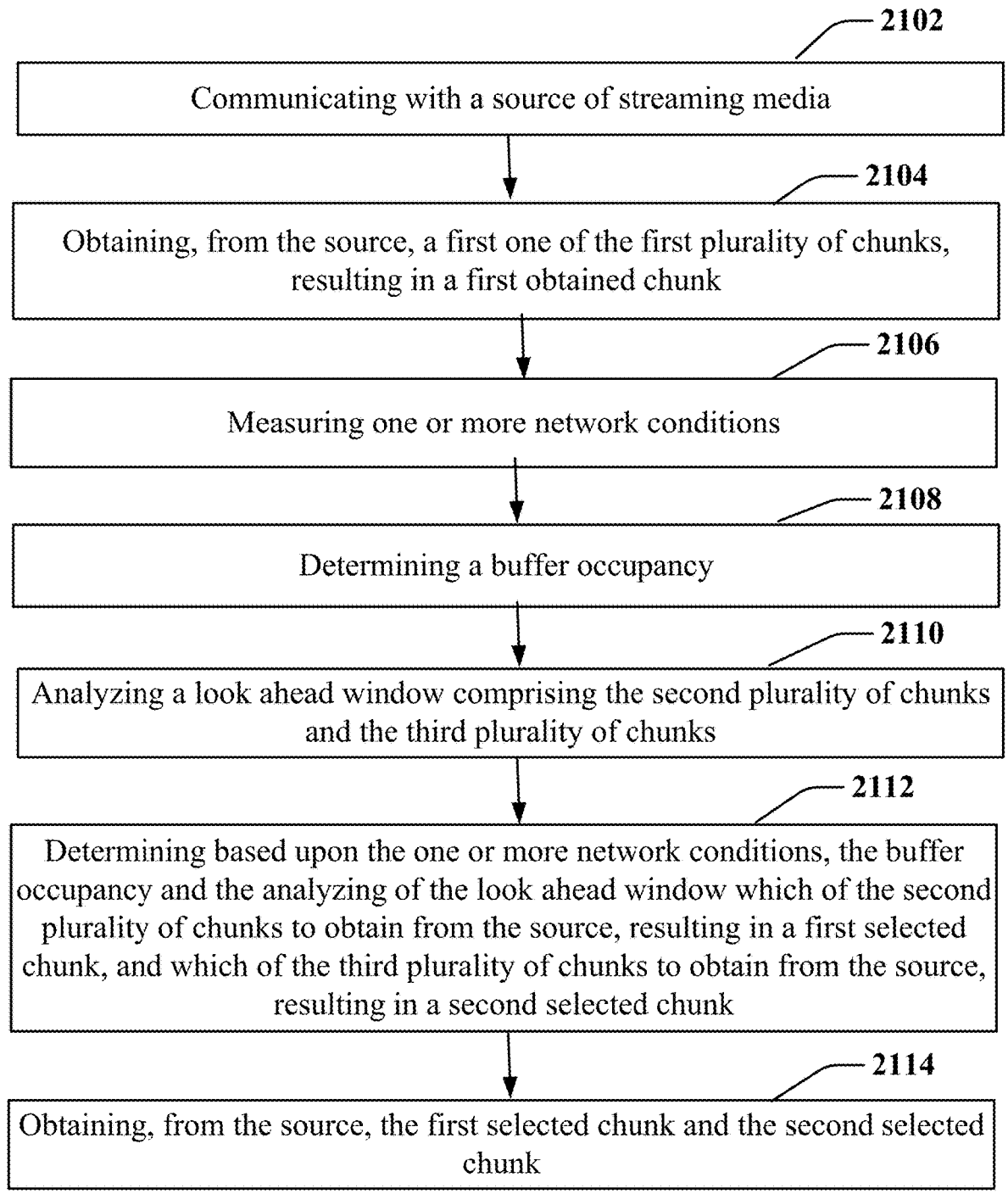

FIG. 2X depicts an illustrative embodiment of a method 2101 in accordance with various aspects described herein.

Figure 2Y:
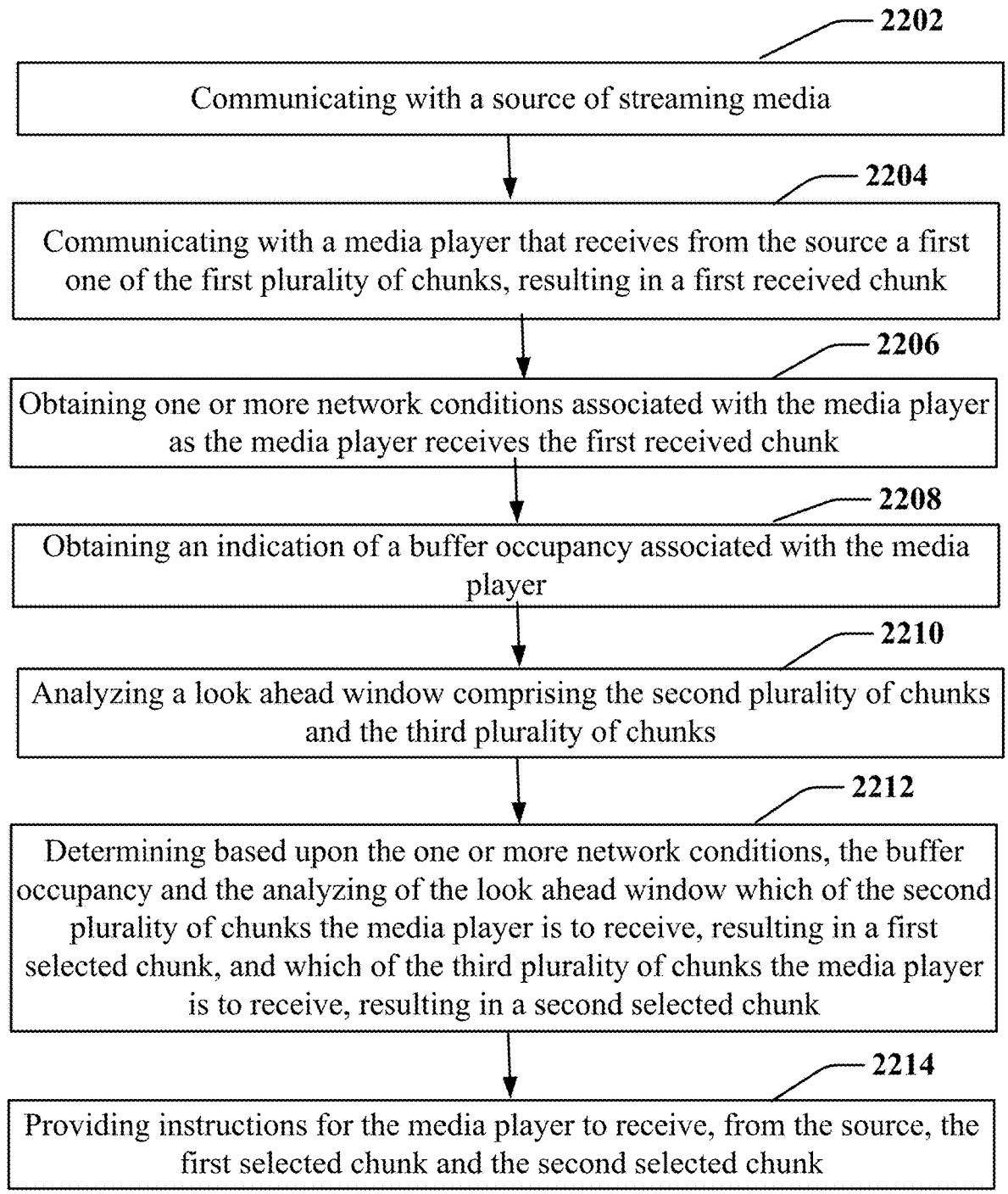

FIG. 2Y depicts an illustrative embodiment of a method 2201 in accordance with various aspects described herein.

Figure 2Z:
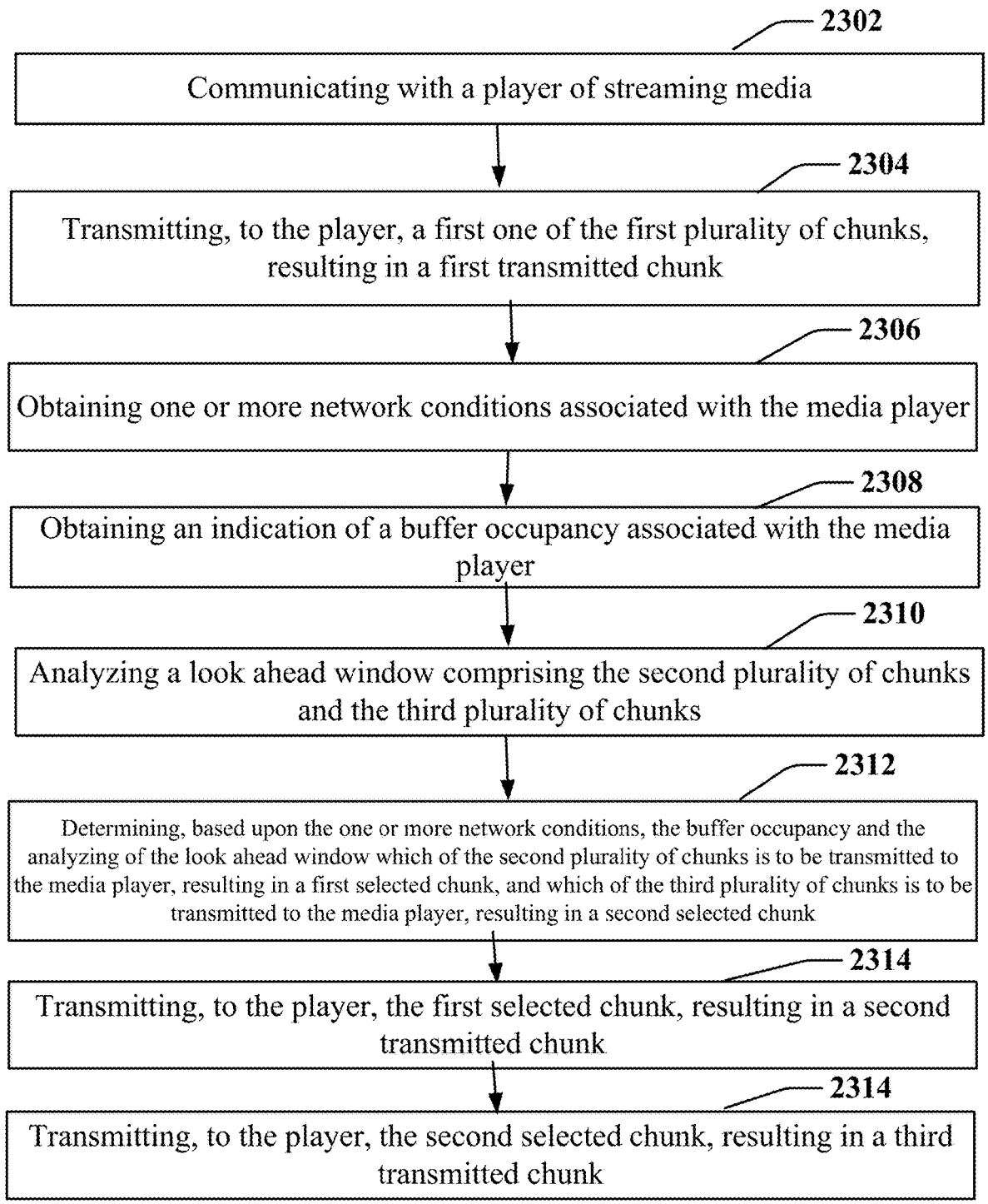

FIG. 2Z depicts an illustrative embodiment of a method 2301 in accordance with various aspects described herein.

FIG. 3 is a block diagram illustrating an example, non-limiting embodiment of a virtualized communication network 300 in accordance with various aspects described herein.

Figure 4:
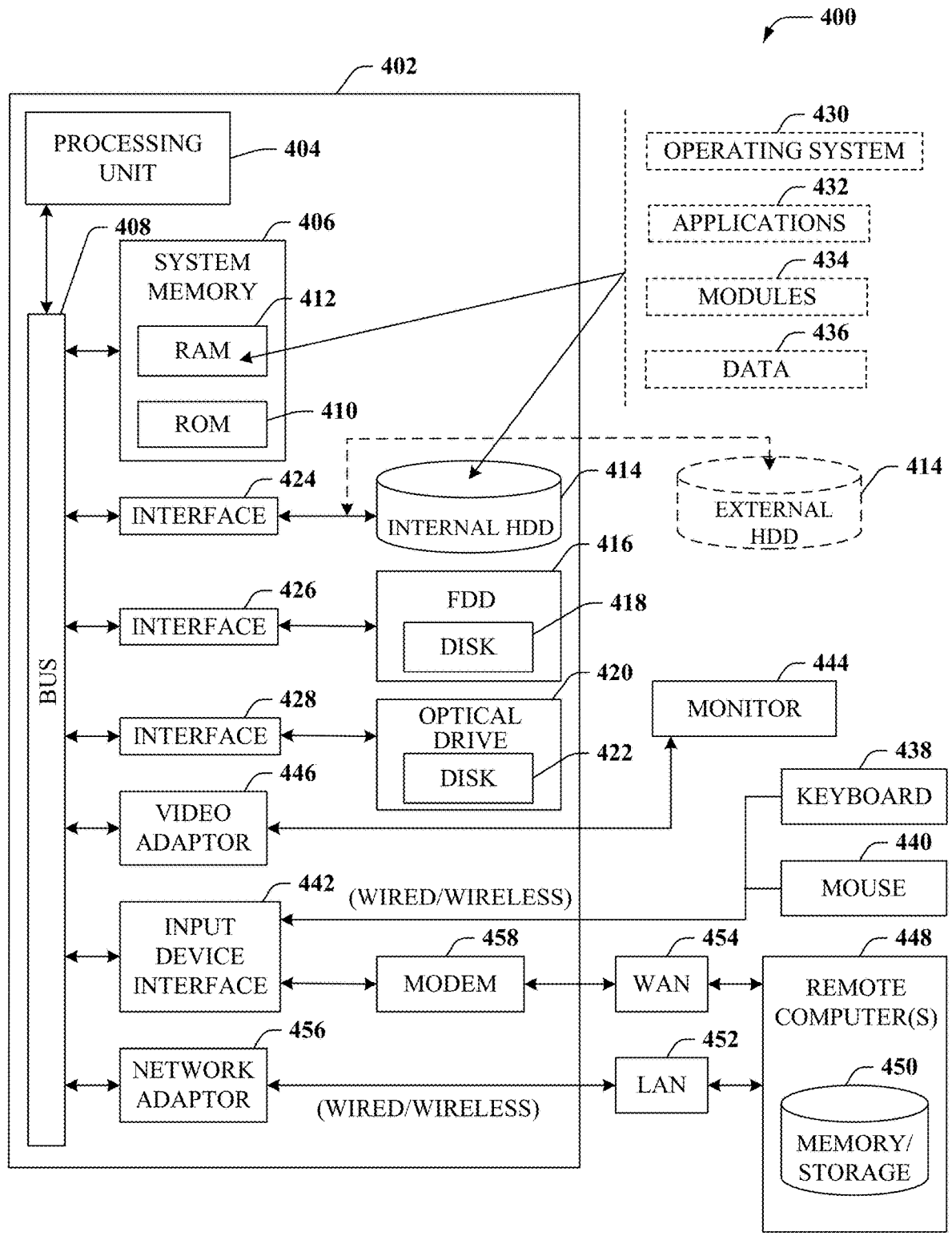

FIG. 4 is a block diagram of an example, non-limiting embodiment of a computing environment 400 in accordance with various aspects described herein.

Figure 5:
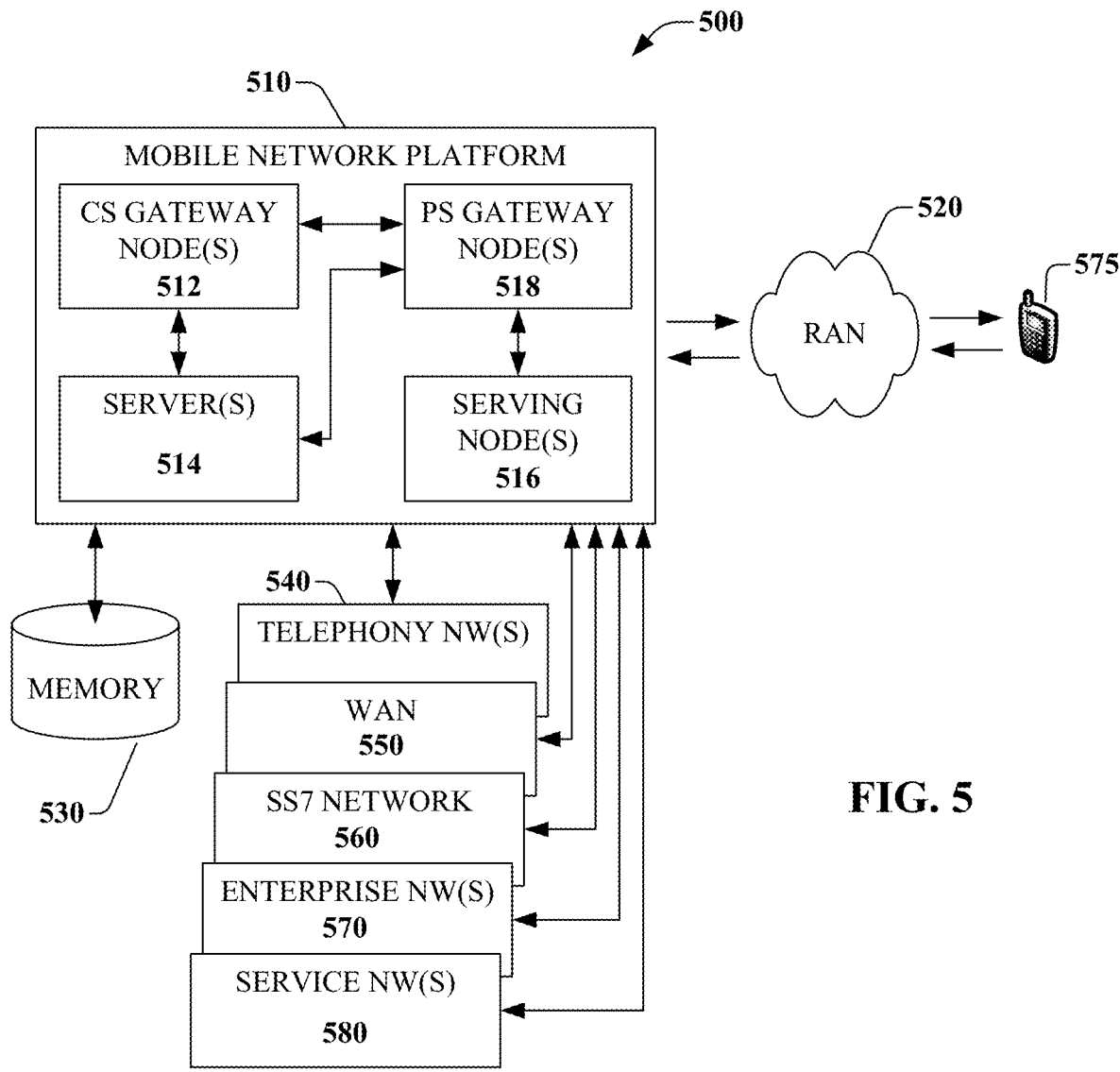

FIG. 5 is a block diagram of an example, non-limiting embodiment of a mobile network platform 500 in accordance with various aspects described herein.

Figure 6:
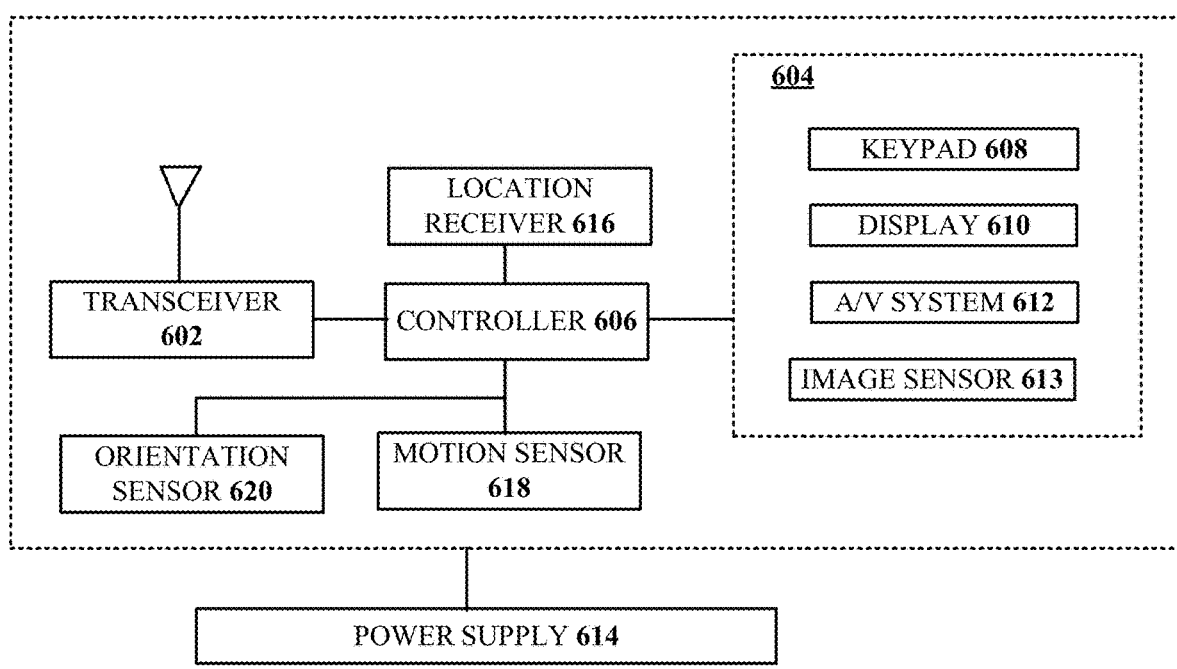

FIG. 6 is a block diagram of an example, non-limiting embodiment of a communication device 600 in accordance with various aspects described herein.

DETAILED DESCRIPTION

The subject disclosure describes, among other things, illustrative embodiments for adaptive bitrate (ABR) streaming adaptation of variable bitrate (VBR) encodings. Other embodiments are described in the subject disclosure.

To develop good techniques for ABR streaming of VBR-encoded video, there are needed appropriate optimization QoE metrics that are suitable for VBR video. Conventionally, there is a lack of metrics suitable to the needs and characteristics of ABR streaming of VBR video. The metrics commonly used for CBR streaming are typically not suitable for VBR. For instance, minimizing bitrate changes is conceptually not very meaningful since even for the same track, the bitrate can change drastically across the video. Appropriate metrics are important to ensure that the rate adaption technique is in fact considering and optimizing the most relevant factors. A second critical question is regarding the actual design of the rate adaptation algorithm for VBR encoded tracks. In addition to highly dynamic network bandwidth and complex tradeoffs incurred by the QoE metrics, VBR rate adaptation faces an additional challenge: chunk size variability. Different chunks corresponding to different portions of the video can have very different sizes (due to very different scene complexities). As described herein, both the above challenges are addressed by various embodiments.

As described herein, the characteristics of a number of VBR-encoded ABR videos using both the very widely used H.264 and the newer HEVC/H.265 codecs are analyzed, and it is demonstrated that traditional QoE metrics and ABR adaptation strategies designed for CBR videos are not suitable for VBR and need to be rethought. Based on the insights, various novel decision factors have been identified (as described herein) for use by the adaptation scheme, and metrics that are more appropriate for capturing the QoE for VBR-encoded ABR streaming are presented.

As described herein is a novel, practical control-theoretic adaptation scheme (sometimes referred to herein as CAVA) for streaming VBR-encoded ABR video. Extensive evaluations using bandwidth traces collected from multiple LTE cellular networks demonstrate that an embodiment of CAVA has good performance, and substantially outperforms certain conventional schemes, even in the challenging variable bandwidth environments typical of cellular networks.

As described herein, an identification of QoE Metrics for ABR streaming of VBR video has been performed. Characteristics of VBR video have been analyzed and it has been demonstrated that: (1) Chunk size is a good indicator of scene complexity. Larger chunk has more spatial Information (SI) and Temporal Information (TI) information, and vice versa. (2) Scene complexity is consistent across the different tracks. A chunk that is relatively large/small in one track is also relatively large/small in another track. In various embodiments, mechanisms are provided that consider scene complexity and deal differently with different scene complexities when making rate adaptation decisions for ABR streaming of VBR video. In this regard, an important factor is that human perception is less sensitive to poor quality for simpler scenes (e.g., low-motion or low-complexity scenes) and more sensitive to quality problems in complex scenes (e.g., high motion). The above two findings (1) and (2) are important and relate to an embodiment that uses the relative chunk sizes to infer the relative complexity of the corresponding different scenes. This can then be used by the rate adaptation algorithms, e.g., to select higher track level for more complex scenes. Using chunk sizes to infer scene complexity has key advantages compared to an approach that uses quality information based on video content (e.g., SI, TI or PSNR). First, it is simple, requiring no computation-heavy content-level analysis. Second, chunk sizes are already known at the client in the conventional dominant ABR standards (DASH and HLS), and hence implementation would typically require no server-side changes. Evaluations of a rate adaptation scheme according to an embodiment (CAVA—described in more detail below) demonstrate that leveraging the relationship between chunk size and scene complexity can lead to a robust adaptation algorithm for VBR video streaming with superior performance that significantly advances the VBR streaming technology.

As described herein, a number of QoE metrics for VBR video streaming are provided, taking account of VBR video characteristics and existing user experience studies. All metrics are computed with respect to the delivered video, i.e., considering the chunks that have been downloaded and played back. One metric is the average track level selected for complex scenes. This is an important metric as improving the quality of complex scenes brings more QoE enhancement than improving simple scenes' quality. Based on observations discussed herein, chunk size can be used to infer scene complexity due to its simplicity and its compatibility to existing DASH and HLS schemes. In one example of the algorithm to compute this metric, one track (e.g., Track 3) is chosen as a reference track, and it is used to define a set of chunk/playback positions that contain the most complex scenes. Using other tracks or the average across tracks yields very similar results due to the chunk size correlation across tracks. H is then defined as the set of the chunk positions that correspond to the 25% largest chunks (the 4th-quartile chunks) in the reference track. This approach is generalizable to other variants of this concept, e.g., top-10%, top-30% of the complex chunks, etc. A second metric is the average track level of all the selected chunks. It differs from average bitrate metric that is often used for CBR videos. This is because each level is of a constant quality but has variable bitrate due to VBR encoding, and hence the level presents a more accurate representation of the video quality than bitrate. A third metric is the average level change per chunk. This considers the level difference of two adjacent chunks since human eyes are more sensitive to level changes in adjacent chunks. The extent of the change is also important since significant level changes disturb viewing experience more than small changes across neighboring levels. Again, it is defined in terms of level changes, instead of bitrate changes (as used for CBR videos). A fourth metric is total duration of re-buffering. This measures the impact of stalls on QoE. It is a widely used metric for both CBR and VBR videos.

As described herein, a Client Rate Adaptation algorithm for ABR streaming of VBR Video is provided (as mentioned, conventional rate adaptation approaches are typically poorly suited to ABR streaming of VBR video). Two important design principles for rate adaptation for VBR video are utilized, taking into account VBR video characteristics: One principle is to be "non-myopic". That is, when determining what quality of chunk to download next, consider not only chunk characteristics at the current position, but also those at future chunk positions. In contrast, a "myopic" scheme selects the track for the next chunk, based on the current resource, only considering the current chunk. A "myopic" scheme leads to track selection that only matches the current resource (either in terms of network bandwidth or player buffer level). This can lead to poor decisions, e.g., selecting a high track for an easy scene; and a low track for a complex scene, which is undesirable for good QoE. Instead, a more macro-level decision process that considers a few future chunk positions can lead to more desirable rate adaptation decisions by more adaptively and elastically allocating resources. For example, when multiple adjacent chunks have vastly different sizes, a "myopic" strategy may mechanically select very high (low) levels for chunks with small (large) sizes, while a "non-myopic" strategy can more judiciously select less "bumpy" levels (preferably favoring large chunks corresponding to more complex scenes) by using resources saved from smaller chunks for larger chunks. The second principle is to be "proactive". That is, since VBR videos have high bitrate variability, it is desirable to account for the variability proactively. Specifically, suppose when making a decision at time t, the player notices consecutive positions after t contain complex scenes. It is thus desirable to choose higher quality levels for these positions. However, this may not be achievable when the network bandwidth is low. Fortunately, with the known chunk size information, the rate adaptation algorithm can possibly react to the cluster of large chunks earlier on by, for example, pre-adjusting the target buffer level (see a more detailed discussion below). By taking actions before it is too late, this "proactive" principle further enhances the adaptiveness of the rate adaptation algorithm.

Figure 1:
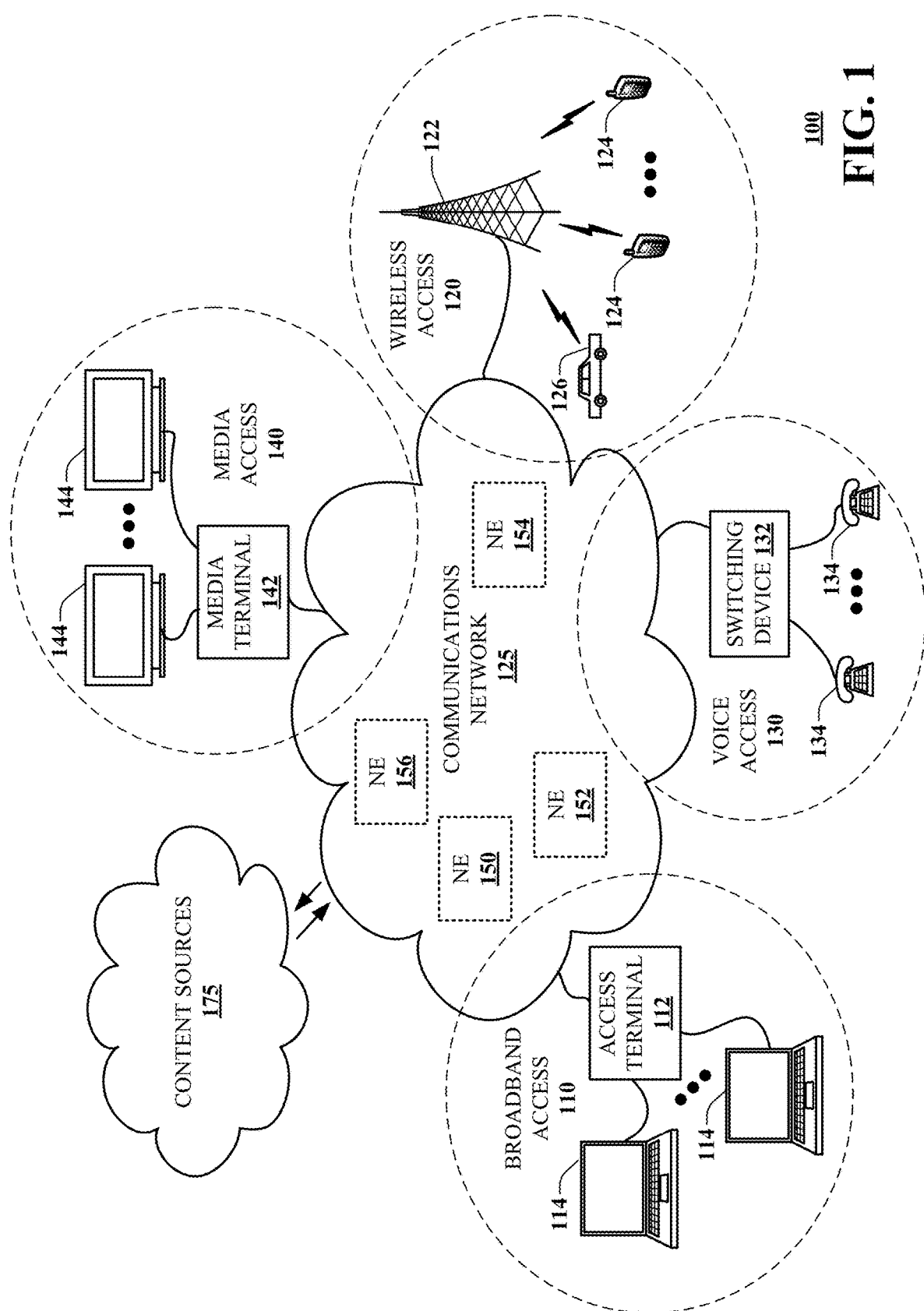
FIG. 1 is a block diagram illustrating an example, non-limiting embodiment of a system 100 in accordance with various aspects described herein.

Referring now to FIG. 1, a block diagram is shown illustrating an example, non-limiting embodiment of a system 100 in accordance with various aspects described herein. For example, system 100 can facilitate in whole or in part adaptive bitrate streaming of variable bitrate encoded video. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Recent studies have shown that conventional video players often do not provide satisfactory QoE, motivating research on designing better rate adaptation techniques. For good user experience, ABR streaming needs to simultaneously achieve three conflicting goals that are closely associated with the user's QoE: (1) maximize the playback bitrate for high video quality experience; (2) minimize the likelihood that the player buffer becomes empty, causing the video playback to freeze and the user to experience an undesirable stall, and (3) minimize the variability of the selected video bitrates for a smooth viewing experience.

Developing ABR streaming techniques with good performance is challenging due to the difficulty of achieving all three goals simultaneously, especially over highly varying network conditions, typical of the last-mile scenarios in cellular networks. Existing work on ABR streaming has centered mostly on CBR encoding, and very little on the VBR case. As described herein, various embodiments provide techniques for ABR streaming of VBR video.

For CBR encoding, the above optimization goals can be naturally mapped to corresponding QoE metrics such as maximizing average bitrate, minimizing re-buffering, and minimizing bitrate changes. However, some of these metrics are less meaningful for VBR encodings. For instance, minimizing bitrate changes is conceptually not very meaningful since even for the same track, the bitrate can change drastically across the video. In addition to identifying suitable metrics, another critical question is regarding the design of the rate adaptation algorithm for VBR encoded tracks. In this regard, in addition to highly dynamic network bandwidth and complex tradeoffs incurred by the QoE metrics, VBR rate adaptation faces an additional challenge: chunk size variability. Different chunks corresponding to different portions of the video can have very different sizes (due to very different scene complexities). As described herein, various embodiments address the above challenges and provide novel techniques for ABR streaming of VBR video.

Referring now to FIG. 2A, this is a block diagram illustrating an example, non-limiting embodiment of a system 200 (which can function, for example, within the system 100 of FIG. 1) in accordance with various aspects described herein. In this FIG. 2A, streaming media player 202 communicates bi-directionally (via the Internet) with streaming media content server 204. Streaming media content server 204 can provide to streaming media player 202 various streaming media content (e.g., variable bitrate streaming media content) as described herein.

Referring now to FIG. 2L, a design of an embodiment instantiating principles described herein within a control-theoretic framework sometimes referred to as CAVA (Control-theoretic Adaption for VBR-based ABR streaming) is shown. The CAVA of this embodiment utilizes the proportional-integral (PI) control theory concept, and introduces significant innovations to tackle the challenges for streaming VBR videos. A control-theoretic framework has been adapted for this embodiment of CAVA since such a framework has shown promise in adapting to dynamic network bandwidth, particularly in cellular networks. The design of the CAVA embodiment of this FIG. 2L includes two tightly coupled controllers that work in synergy using easy-to-obtain information such as VBR chunk size and historically observed network bandwidth. At a high level, this CAVA uses two controllers: an Inner Controller (sometimes referred to herein as CAVA-C) that reacts faster over a shorter time scale and an Outer Controller that reacts slower over a longer time scale. A more detailed discussion of the design of these two controllers (as well as the overall design of this CAVA) follows.

Still referring to FIG. 2L, two important novel components in this CAVA are the Inner Controller and the Outer Controller. The Inner Controller determines, for the next chunk to be downloaded, what track level to select. The Inner Controller includes the PI Controller and Optimizer. The PI (proportional-integral) Controller is used to generate the control policy. The control policy determines the buffer filling rate—how quickly the buffer is to be filled. The PI Controller includes not only the proportional-integral part, but the part to make the control loop linear. Then the control policy will be used as input to the Optimizer for selecting the quality level for the next chunk. The Optimizer considers both the video quality and the changes in video quality to achieve a balance between these two conflicting QoE metrics (both maximizing the bandwidth utilization and minimizing the level changes) for VBR video. Specifically, in one embodiment, the Optimizer achieves this by solving a regularized least squares problem. The Optimizer explicitly follows the "non-myopic" principle (described herein) by applying a relatively shorter term (compared to the Outer Controller) moving average (MA) filter on the sizes of the next several chunks. In particular, in one embodiment, when determining what track to select for chunk position i, for each track, the Optimizer considers a window of the next W chunks (W can be a configurable (e.g., user configurable) parameter), computes the average bitrate over that window and uses this average value as the representative bitrate associated with that chunk position for that track in the optimization formulation (discussed herein).

Still referring to FIG. 2L, the Outer Controller uses the control theoretic concept of preview control and utilizes future chunk information to avoid re-buffering for VBR video. The target buffer (which can be a configurable (e.g., user configurable) parameter in CAVA) is the client buffer level (e.g., in terms of seconds worth of playback data) that the player is desired to preferably maintain. If just the Inner Controller was used, a fixed target buffer would be specified. However using a fixed value is not appropriate for VBR, where chunk sizes vary considerably across the video. For example, if the target buffer is set too low, then the client will tend to have less data in its buffer. For VBR, some chunk sizes may be larger than the global average, resulting in more time needed to download those large chunks. Using the fixed target buffer will cause the buffer to drain faster when these chunks are being downloaded. If the network bandwidth is low at that time, then this effect is exacerbated and increases the potential for buffer being drained causing stalls. Therefore, it is desirable to proactively switch to a lower track level (which has smaller size chunks) earlier on, and therefore fetch and store more seconds worth of content in the buffer to avoid re-buffering later. This goal can be achieved by adaptively increasing the target buffer level. In particular, consider at time t, the player is determining what track to select for chunk position i. In one embodiment, the Outer Controller does the following: it selects one representative track (e.g. track 3), and considers a window of the next V chunks (V can be a configurable (e.g., user configurable) parameter, V>>W, e.g., V=100 chunks), and computes the average bitrate over that window. The Outer Controller uses this average value as the representative bitrate associated with that chunk position for that track, and finally uses the difference between this value and the global average bitrate for the track to guide the adjustment of the target buffer. In one embodiment, the Outer Controller uses the amount (long term moving average–global average)/global average*V*L as the amount by which the target buffer should be adjusted upwards (L is the chunk size, e.g. 2 s). The adaptive target buffer works as the input for Inner Controller.

Still referring to FIG. 2L, putting everything together, the Inner Controller in this CAVA takes three sources of input: the target buffer level xr(t) determined by the Outer Controller, the estimated network bandwidth, and a short-term average of future chunk bitrate (obtained by feeding the VBR chunk sizes to a moving average (MA) filter). The Inner Controller then outputs the selected level through the Optimizer. The Outer Controller takes the average variability of the chunk sizes (obtained by feeding the VBR chunk sizes to a long-term MA filter) and the base target buffer level as input, and outputs the adaptive target buffer level, xr(t), to the inner controller.

Still referring to FIG. 2L, reference will now be made to certain details of a PIA Core Controller (e.g., for PID-control based ABR streaming) according to an embodiment. According to this embodiment, the ABR buffer dynamics are as follows:

$$\dot{x}_t = \begin{cases} C_t / R_t(\ell_t), & \text{if } t \leq \delta \\ C_t / R_t(\ell_t) - 1(x_t - \Delta), & \text{otherwise} \end{cases}$$

wherein $x_t$ is the current buffer level, $C_t$ is the bandwidth, $\Delta$ is the chunk size, $\delta$ is the start-up latency, and $R_t(l_t)$ is the bitrate selection.

Further, according to this embodiment, the Control policy is as follows:

$$u_t = K_p(x_r - x_t) + K_i \int_0^t (x_r - x_t)dt + 1(x_t - \Delta)$$

wherein $K_p$ is the proportional gain, $K_i$ is the integral gain, and $x_r$ is the target buffer level.

Still referring to FIG. 2L, reference will now be made again to the Inner controller according to an embodiment. According to this embodiment, the PI (proportional-integral) Controller is used for generating the control policy. Further, the Optimizer: (a) considers both maximizing the bandwidth utilization and minimizing the level changes by solving regularized least squares problem (which is a conventional way to minimize the difference between target value and real value); and (b) uses short term average of next W chunk size ("non-myopic" principle). In one example, the minimization can be carried out as follows:

$$J(\ell_t) = \sum_{k=t}^{t+N} \left(u_k \overline{R}_t(\ell_t) - \hat{C}_k\right)^2 + \eta(r(\ell_t) - r(\ell_{t-1}))^2$$

wherein $\overline{R}_t(l_t)$ is the average bitrate over a window of W chunks; and wherein r(l) is the average bitrate of level l.

Still referring to FIG. 2L (along with 2M), reference will now be made again to the Outer Controller according to an embodiment. According to this embodiment, the Preview control can operate utilizing the following: (a) Control concept to use future information to improve performance; (b) Analogous to driving—drives along a curvy road, looks ahead for a range and steers the vehicle proactively to avoid deviating from the road; (c) proactively adjust target buffer by considering the future chunk size variability, calculating the difference between the actual bitrate and expected value.

Reference will now be made to an evaluation setup according to various embodiments. This evaluation setup utilized 100 LTE network traces. There were 4 videos encoded both by H.264 and H.265. The evaluation setup included Bandwidth prediction. The evaluation setup utilized the following QoE metrics: (a) Avg level of Q4 chunks; (b) Avg level; (c) Avg level changes; (d) Total re-buffering. Various embodiments were compared against the following conventional algorithms: BBA1, RBA. The evaluation setup answered questions including: (a) Performance; (b) Codec impact.

Referring now to the performance comparisons shown in FIGS. 2N-2Q, it is seen that CAVA according to an embodiment achieves better balance (as compared to BBI1 and RBA) among conflicting QoE metrics. For example, for 90% and 70% of the cases, CAVA had a higher average level for Q4 chunks than BBA1 and RBA (for 68% and 33% of all the cases, the CAVA had an improvement of at least 10% respectively). CAVA had 90% of the average level of BBA-1 and RBA. CAVA had only 20% of average level changes of that of BBA1 and RBA. CAVA had 49% and 44% of re-buffering time compared to BBA1 and RBA.

Referring now to FIG. 2R, it is seen that in this case study CAVA according to an embodiment achieves higher quality for high motion scenes. The graphs 246, 247, 248 and 249 of FIG. 2R depict level selections for various schemes under one network trace. The shaded bars mark Q4 chunks (Elephant Dream, H.264).

Referring now to FIG. 2S, graphs 250 and 251 illustrate certain encoding behavior (H265 saves in this example, over ⅓ bitrate for same quality compared with H264).

Referring now to FIGS. 2T-2W, graphs 252, 253, 254 and 255 show certain impact of codec (H264 vs. H265) according to an embodiment. Each of graphs 252, 253, 254 and 255 relates to performance of H.264 and H.265 (Elephant Dream). The results were obtained using 100 LTE network traces. As seen in these graphs there was a significantly lower bitrate requirement of H.265 encoding. In various tests, not all of which are shown here, 4 different videos were used to compare a CAVA embodiment with H264 and H265 (the following result numbers are based on the 4 different videos). With the CAVA embodiment, 12% to 27% higher Q4 chunk levels were obtained. Also CAVA embodiment obtained 39% to 46% of re-buffering times on average compared to H.264. These results indicate that high efficient encoding will benefit the QoE of video streaming.

FIG. 2X depicts an illustrative embodiment of a method 2101 in accordance with various aspects described herein. As seen in this FIG. 2X, step 2102 comprises communicating with a source of streaming media, wherein the streaming media at the source is variable bitrate encoded, wherein the streaming media at the source comprises a first plurality of chunks, wherein each of the first plurality of chunks corresponds to a first portion of the streaming media, wherein the streaming media at the source comprises a second plurality of chunks, wherein each of the second plurality of chunks corresponds to a second portion of the streaming media, wherein the streaming media at the source comprises a third plurality of chunks, wherein each of the third plurality of chunks corresponds to a third portion of the streaming media, wherein presentation of the second portion of the streaming media follows in time presentation of the first portion of the streaming media, and wherein presentation of the third portion of the streaming media follows in time presentation of the second portion of the streaming media. Next, step 2104 comprises obtaining, from the source, a first one of the first plurality of chunks, resulting in a first obtained chunk. Next, step 2106 comprises measuring one or more network conditions. Next, step 2108 comprises determining a buffer occupancy. Next, step 2110 comprises analyzing a look ahead window comprising the second plurality of chunks and the third plurality of chunks. Next, step 2112 comprises determining based upon the one or more network conditions, the buffer occupancy and the analyzing of the look ahead window which of the second plurality of chunks to obtain from the source, resulting in a first selected chunk, and which of the third plurality of chunks to obtain from the source, resulting in a second selected chunk. Next, step 2114 comprises obtaining, from the source, the first selected chunk and the second selected chunk. While for purposes of simplicity of explanation, the respective processes are shown and described as a series of blocks in FIG. 2X, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Reference will now be made to another illustrative embodiment of a method in accordance with various aspects described herein. This method comprises communicating, by a processing system comprising a processor, with a source of streaming media, wherein the streaming media at the source is variable bitrate encoded, wherein the streaming media at the source comprises X number of portions, wherein X is an integer greater than 1, wherein the portions are in chronological order with respect to one another, and wherein each of the portions has associated therewith a respective set of chunks. A next step comprises obtaining by the processing system, from the source, a first chunk from a first one of the sets of chunks, resulting in a first obtained chunk, wherein the first obtained chunk corresponds to an initial portion that is earliest in time. A next step comprises determining by the processing system, based upon characteristics of each chunk of W sets of chunks, which chunks to next obtain, resulting in a plurality of selected chunks, wherein W is an integer greater than 1, and wherein each of the W sets of chunks corresponds, in a presentation, to a respective portion that follows the initial portion in time. A next step comprises obtaining by the processing system, from the source, the plurality of selected chunks.

FIG. 2Y depicts an illustrative embodiment of a method 2201 in accordance with various aspects described herein. As seen in this FIG. 2Y, step 2202 comprises communicating with a source of streaming media, wherein the streaming media at the source is variable bitrate encoded, wherein the streaming media at the source comprises a first plurality of chunks, wherein each of the first plurality of chunks corresponds to a first portion of the streaming media, wherein the streaming media at the source comprises a second plurality of chunks, wherein each of the second plurality of chunks corresponds to a second portion of the streaming media, wherein the streaming media at the source comprises a third plurality of chunks, wherein each of the third plurality of chunks corresponds to a third portion of the streaming media, wherein presentation of the second portion of the streaming media follows in time presentation of the first portion of the streaming media, and wherein presentation of the third portion of the streaming media follows in time presentation of the second portion of the streaming media. Next, step 2204 comprises communicating with a media player that receives from the source a first one of the first plurality of chunks, resulting in a first received chunk. Next, step 2206 comprises obtaining one or more network conditions associated with the media player as the media player receives the first received chunk. Next, step 2208 comprises obtaining an indication of a buffer occupancy associated with the media player. Next, step 2210 comprises analyzing a look ahead window comprising the second plurality of chunks and the third plurality of chunks. Next, step 2212 comprises determining based upon the one or more network conditions, the buffer occupancy and the analyzing of the look ahead window which of the second plurality of chunks the media player is to receive, resulting in a first selected chunk, and which of the third plurality of chunks the media player is to receive, resulting in a second selected chunk. Next, step 2214 comprises providing instructions for the media player to receive, from the source, the first selected chunk and the second selected chunk.

While for purposes of simplicity of explanation, the respective processes are shown and described as a series of blocks in FIG. 2Y, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

FIG. 2Z depicts an illustrative embodiment of a method 2301 in accordance with various aspects described herein. As seen in this FIG. 2Z, step 2302 comprises communicating with a player of streaming media, wherein the streaming media is variable bitrate encoded, wherein the streaming media comprises a first plurality of chunks, wherein each of the first plurality of chunks corresponds to a first portion of the streaming media, wherein the streaming media comprises a second plurality of chunks, wherein each of the second plurality of chunks corresponds to a second portion of the streaming media, wherein the streaming media comprises a third plurality of chunks, wherein each of the third plurality of chunks corresponds to a third portion of the streaming media, wherein presentation of the second portion of the streaming media follows in time presentation of the first portion of the streaming media, and wherein presentation of the third portion of the streaming media follows in time presentation of the second portion of the streaming media. Next, step 2304 comprises transmitting, to the player, a first one of the first plurality of chunks, resulting in a first transmitted chunk. Next, step 2306 comprises obtaining one or more network conditions associated with the media player. Next, step 2308 comprises obtaining an indication of a buffer occupancy associated with the media player. Next, step 2310 comprises analyzing a look ahead window comprising the second plurality of chunks and the third plurality of chunks. Next, step 2312 comprises determining, based upon the one or more network conditions, the buffer occupancy and the analyzing of the look ahead window which of the second plurality of chunks is to be transmitted to the media player, resulting in a first selected chunk, and which of the third plurality of chunks is to be transmitted to the media player, resulting in a second selected chunk. Next, step 2314 comprises transmitting, to the player, the first selected chunk, resulting in a second transmitted chunk. Next, step 2316 comprises transmitting, to the player, the second selected chunk, resulting in a third transmitted chunk.

While for purposes of simplicity of explanation, the respective processes are shown and described as a series of blocks in FIG. 2Z, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, the relative chunk sizes can be used by various embodiments to infer the complexity of the scenes, which in turn can be used by rate adaptation algorithms (e.g., select higher level for more complex scenes).

As described herein, various embodiments provide new QoE metrics for VBR video streaming. These new metrics include: 1) the average level selected for complex scenes (e.g., average level of $4^{th}$ quartile chunks); 2) the average level of all the selected chunks; 3) the average level change per chunk; and 4) total duration of re-buffering.

As described herein, conventional CBR-based rate adaptation techniques are typically insufficient for VBR videos without considering chunk size variability. For example, using the conventional overall average value as the nominal bitrate will typically cause more re-buffering when actual bitrate is higher than the average. In another example, using the conventional peak value as the nominal bitrate typically leads to too conservative bitrate choices. Various embodiments described herein provide enhancements optimized to VBR.

As described herein, momentum has been growing towards using variable bitrate (VBR) encodings which can improve user QoE and reduce the network bandwidth requirements compared to Constant Bit Rate (CBR) encodings. Various embodiments address challenges in ABR streaming of VBR-encoded video, particularly over cellular networks exhibiting highly variable network conditions. Various embodiments provide for novel and practical control-theoretic adaptation schemes. Various CAVA embodiments achieve significantly superior performance and QoE compared to certain conventional streaming techniques.

As described herein, various embodiments can be implemented in the context of streaming content providers/services, software vendors/app developers (e.g., including those building ABR streaming systems), and network operators (e.g., cellular network operators).

As described herein, various embodiments provide mechanisms to facilitate designing ABR adaptation for streaming VBR-encoded videos.

As described herein, various embodiments can leverage technological advancements in VBR encoding pipelines.

As described herein, various embodiments relate to adaptive bitrate streaming of VBR encoded content over the Internet. In one specific example, the relationship of quality and chunk size (segment size) is used to design a novel scheme for ABR streaming of VBR-encoded videos.

As described herein, various embodiments permit (or require) the ABR adaptation logic to take account of scene complexity.

As described herein is an analysis of characteristics of VBR video.

As described herein, is a practical way for the client-side adaptation logic to infer scene complexity information (using relative chunk sizes).

As described herein are new QoE metrics for VBR streaming.

As described herein are various design principles of an ABR scheme for VBR streaming (e.g., "non-myopic" and "proactive").

As described herein is a novel control-based approach for VBR streaming—sometimes referred to herein in connection with various embodiments as CAVA (in various examples, CAVA outperforms various conventional techniques).

As described herein, various novel techniques for adaptive ABR streaming of VBR video are provided. Extensive evaluations show that various embodiments of CAVA for adaptive ABR streaming of VBR video outperform certain conventional schemes in delivering better QoE (e.g., high average bitrate with significantly lower bitrate changes and stalls) and incur very small computational overhead. For example, compared to 2 conventional schemes, an embodiment of CAVA causes much lower level changes (20%) and stalls/re-bufferings (44%-49%). Further, an embodiment of CAVA has low computation overhead—its runtime overhead is only around 1.0 s for a 10-minute video. High efficiency Video Coding (HEVC/H.265) requires less bits for the same quality level (e.g., saves over ⅓ bitrate for same quality compared with H264). The delivered quality was examined of VBR video streaming for HEVC/H.265 VBR encoding vs. H.264 VBR encoding. When using an embodiment of CAVA, for different VBR videos, HEVC video leads to higher quality levels (12% to 27% higher average level of Q4 chunks) than H.264. The re-buffering time of HEVC is only 39%-46% on average compared to that of H.264.

As described herein, comprehensive evaluations of CAVA embodiments using a large number of real LTE traces and various genres of VBR videos were made.

As described herein, evaluation results shows that various embodiments are better than BBA-1 in terms of superior QoE metrics (e.g., an average of 7%-23% improvement in viewing quality and 36%-74% reduction in re-buffering compared to BBA-1).

As described herein various embodiments are designed from the ground up specifically for VBR-encoded streaming and are based on the insight that you need much more than just counting different chunk sizes (segment sizes) to develop an ABR adaptation for VBR-encoded video that has good performance (various embodiments described herein incorporate principles like "non-myopic" and "proactive").

As described herein, an evaluation shows that various embodiments have superior performance to an "MPC" approach of Yin et al., "Control-Theoretic Approach for Dynamic Adaptive Video Streaming over HTTP" SIGCOMM '15, Aug. 17-21, 2015, London, United Kingdom (the superior performance in this regard includes, e.g., much lower re-buffering (i.e., stalls)).

As described herein, various embodiments provide ABR adaptation logic that takes account of scene complexity in its decision process.

As described herein, various embodiments provide a simple practical way for the client-side adaptation logic to infer scene complexity information (using relative chunk size information).

In another embodiment, any desired number of video quality "bins" (e.g., 2, 3, 4, 5, 6, 7, 8, 9 or 10) can be used.

As described herein, the design and evaluations have mainly focused on the use case of Video on Demand (VOD) streaming of prerecorded video content. In other embodiments the overall CAVA approach can be easily extended to the live video streaming use case. The main difference is that in the live streaming case, the amount of future lookahead will be more limited compared to the VOD use case—this can be accommodated in a straightforward way by appropriately tuning the moving average windows in CAVA.

As described herein, various embodiments can be utilized by any video streaming service that wants to support an ABR streaming of VBR-encoded video over the network and is interested at delivering robust high quality user experience. Leading content providers have now begun adopting VBR encoding for ABR video streaming, spurred by the promise of substantial improvements in the quality-to-bits ratio compared to CBR, and by technological advancements in VBR encoding pipelines. Various CAVA embodiments described herein can work for any type of IP network. Various embodiments can be applied to an over-the-top streaming service, improving customer experience.

In various embodiments, part of the inner controller described herein can borrow the idea of PIA.

In various embodiments, relative resource requirements in the future can be determined and/or estimated; intelligent tradeoffs can be made based upon the determinations and/or estimates.

In various embodiments, control theory can be utilized.

In various embodiments, measurement (or determination) of a network condition can be used to determine available bandwidth.

In various embodiments, determinations (such as which chunks to obtain in the future) can be made by a media player (e.g. a media player in communication with a server that provides video content).

In various embodiments, determinations (such as which chunks to send in the future to a media player) can be made by a server (e.g. a server in communication with a media player that receives video content).

In various embodiments, determinations (such as which chunks to send in the future to a media player from a server) can be made by another device (e.g., a $3^{rd}$ party device such as a cloud device). In one example, the cloud device is in communication with the media player and the server to make the determinations and to instruct the server and/or media player.

In various embodiments, some or all of the functions described herein can be implemented on a server (e.g., a source of video content); some or all of the functions described herein can be implemented on a media player (e.g., a recipient of video content); some or all of the functions described herein can be implemented on a cloud device; some or all of the functions described herein can be implemented on a combination of a server (e.g., a source of video content), a media player (e.g., a recipient of video content), and/or a cloud device.

In one embodiment, the look ahead window can comprise X number of additional sets of chunks, each of the X number of additional sets of chunks corresponding to one of X number of additional portions of the streaming media. In one example, a particular set of chunks can have A number of chunks and another set of chunks can have B number of chunks. In one specific example, each of A and B are integers and are the same value. In another specific example, each of A and B are integers and are different values.

Referring now to FIG. 3, a block diagram is shown illustrating an example, non-limiting embodiment of a virtualized communication network in accordance with various aspects described herein. In particular a virtualized communication network is presented that can be used to implement some or all of the subsystems and functions of system 100, some or all of the subsystems and functions of system 200, some or all of the steps of methods 2101, 2201 and/or 2301. For example, virtualized communication network 300 can facilitate in whole or in part adaptive bit rate streaming of variable bit rate encoded video.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part adaptive bitrate streaming of variable bitrate encoded video.

Generally, program modules comprise routines, programs, components, data structures, etc., that perform particular tasks or implement particular abstract data types. Moreover, those skilled in the art will appreciate that the exemplary methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part adaptive bitrate streaming of variable bitrate encoded video. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part adaptive bitrate streaming of variable bitrate encoded video.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with VBR adaptation) can employ various AI-based schemes for carrying out various embodiments thereof. Moreover, a classifier can be employed to determine a ranking or priority (e.g., in connection with VBR adaptation). A classifier is a function that maps an input attribute vector, x=(x1, x2, x3, x4, . . . , xn), to a confidence that the input belongs to a class, that is, f(x)= confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device comprising:
a processing system including a processor; and
a memory that stores executable instructions that, when executed by the processing system, perform operations, the operations comprising:
communicating with a source of streaming media, wherein the streaming media at the source is variable bitrate encoded, wherein the streaming media at the source comprises a first plurality of chunks, wherein each of the first plurality of chunks corresponds to a first portion of the streaming media, wherein the streaming media at the source comprises a second plurality of chunks, wherein each of the second plurality of chunks corresponds to a second portion of the streaming media, wherein the streaming media at the source comprises a third plurality of chunks, wherein each of the third plurality of chunks corresponds to a third portion of the streaming media, wherein presentation of the second portion of the streaming media follows in time presentation of the first portion of the streaming media, and wherein presentation of the third portion of the streaming media follows in time presentation of the second portion of the streaming media;

obtaining, from the source, a first one of the first plurality of chunks, resulting in a first obtained chunk;

determining an average bit rate for a first window of chunks of the first plurality of chunks, wherein the first window of chunks begins with the first obtained chunk;

determining a difference between the average bit rate for the first window of chunks of the first plurality of chunks and a global average bit rate for the first plurality of chunks;

adjusting a target buffer level according to the difference that is determined to generate an adjusted target buffer level;

measuring one or more network conditions;

analyzing a look ahead window comprising the second plurality of chunks and the third plurality of chunks;

determining which of the second plurality of chunks to obtain from the source, resulting in a first selected chunk, and which of the third plurality of chunks to obtain from the source, resulting in a second selected chunk, wherein the determining is based upon the one or more network conditions, the adjusted target buffer level, and the analyzing of the look ahead window; and obtaining, from the source, the first selected chunk and the second selected chunk.

2. The device of claim 1, wherein:
the determining which of the second plurality of chunks to obtain is based upon a first respective indication, for each of the second plurality of chunks, of a complexity of the chunk;
each first indication is based upon a size of a respective one of each of the second plurality of chunks;
the determining which of the second plurality of chunks to obtain thus takes into account the size of each of the second plurality of chunks;
the determining which of the third plurality of chunks to obtain is based upon a second respective indication, for each of the third plurality of chunks, of a complexity of the chunk;
each second indication is based upon a size of a respective one of each of the third plurality of chunks; and
the determining which of the third plurality of chunks to obtain thus takes into account the size of each of the third plurality of chunks.

3. The device of claim 2, wherein the operations further comprise:
calculating a difference between an actual streaming bitrate and an expected streaming bitrate; and
adjusting a target buffer level based upon the difference between the actual streaming bitrate and the expected streaming bitrate.

4. The device of claim 2, wherein:
the second plurality of chunks has either low complexity, medium complexity, or high complexity;
the complexity of each of the second plurality of chunks are the same;
the third plurality of chunks has either low complexity, medium complexity, or high complexity; and
the complexity of each of the third plurality of chunks are the same.

5. The device of claim 2, wherein:
the size of each respective one of each of the second plurality of chunks is obtained from the source; and
the size of each respective one of each of the third plurality of chunks is obtained from the source.

6. The device of claim 1, wherein an initial target buffer level is initialized according to a user preference.

7. The device of claim 1, wherein the source of the streaming media comprises a server.

8. The device of claim 1, wherein the device comprises a media player.

9. The device of claim 1, wherein the operations further comprise:
playing the first obtained chunk;
playing the first selected chunk; and
playing the second selected chunk.

10. The device of claim 1, wherein the look ahead window further comprises X number of additional sets of chunks, each of the X number of additional sets of chunks corresponding to one of X number of additional portions of the streaming media, wherein X is an integer between 1 and 20, inclusive.

11. The device of claim 1, wherein the communicating with the source, the obtaining the first one of the first plurality of chunks, the obtaining the first selected chunk and the obtaining the second selected chunk are carried out via a wired communication channel, a wireless communication channel, or any combination thereof.

12. A method, comprising:
communicating, by a processing system including a processor, with a source of streaming media, wherein the streaming media at the source is variable bitrate encoded, wherein the streaming media at the source comprises a first plurality of chunks, wherein each of the first plurality of chunks corresponds to a first portion of the streaming media, wherein the streaming media at the source comprises a second plurality of chunks, wherein each of the second plurality of chunks corresponds to a second portion of the streaming media, wherein the streaming media at the source comprises a third plurality of chunks, wherein each of the third plurality of chunks corresponds to a third portion of the streaming media, wherein presentation of the second portion of the streaming media follows in time presentation of the first portion of the streaming media, and wherein presentation of the third portion of the streaming media follows in time presentation of the second portion of the streaming media;

communicating, by the processing system, with a media player that receives from the source a first one of the first plurality of chunks, resulting in a first received chunk;

determining, by the processing system, an average bit rate for a first window of chunks of the first plurality of chunks, wherein the first window of chunks begins with the first received chunk;

determining, by the processing system, a difference between the average bit rate for the first window of chunks of the first plurality of chunks and a global average bit rate for the first plurality of chunks;

adjusting, by the processing system, a target buffer level according to the difference that is determined to generate an adjusted target buffer level;

obtaining, by the processing system, one or more network conditions associated with the media player as the media player receives the first received chunk;

analyzing, by the processing system, a look ahead window comprising the second plurality of chunks and the third plurality of chunks;

determining, by the processing system, which of the second plurality of chunks the media player is to receive, resulting in a first selected chunk, and which of the third plurality of chunks the media player is to receive, resulting in a second selected chunk, wherein the determining is based upon the one or more network conditions, the adjusted target buffer level, and the analyzing of the look ahead window; and providing, by the processing system, instructions for the media player to receive, from the source, the first selected chunk and the second selected chunk.

13. The method of claim 12, wherein:
the source of the streaming media is a server; and
the instructions are provided to the server, the media player, or both.

14. The method of claim 12, wherein the one or more network conditions are obtained from the media player.

15. The method of claim 12, wherein an initial target buffer level is initialized according to a user preference.

16. A computer-readable storage medium comprising executable instructions that, when executed by a processing system including a processor, facilitate performance of operations, the operations comprising:

communicating with a player of streaming media, wherein the streaming media is variable bitrate encoded, wherein the streaming media comprises a first plurality of chunks, wherein each of the first plurality of chunks corresponds to a first portion of the streaming media, wherein the streaming media comprises a second plurality of chunks, wherein each of the second plurality of chunks corresponds to a second portion of the streaming media, wherein the streaming media comprises a third plurality of chunks, wherein each of the third plurality of chunks corresponds to a third portion of the streaming media, wherein presentation of the second portion of the streaming media follows in time presentation of the first portion of the streaming media, and wherein presentation of the third portion of the streaming media follows in time presentation of the second portion of the streaming media;

transmitting, to the player, a first one of the first plurality of chunks, resulting in a first transmitted chunk;

obtaining one or more network conditions associated with the player;

determining an average bit rate for a first window of chunks of the first plurality of chunks, wherein the first window of chunks begins with the first transmitted chunk;

determining a difference between the average bit rate for the first window of chunks of the first plurality of chunks and a global average bit rate for the first plurality of chunks;

adjusting a target buffer level according to the difference that is determined to generate an adjusted target buffer level;

analyzing a look ahead window comprising the second plurality of chunks and the third plurality of chunks;

determining which of the second plurality of chunks is to be transmitted to the media player, resulting in a first selected chunk, and which of the third plurality of chunks is to be transmitted to the player, resulting in a second selected chunk wherein the determining is based upon the one or more network conditions, the adjusted target buffer level, and the analyzing of the look ahead window;

transmitting, to the player, the first selected chunk, resulting in a second transmitted chunk; and transmitting, to the player, the second selected chunk, resulting in a third transmitted chunk.

17. The computer-readable storage medium of claim 16, wherein the one or more network conditions associated with the player is obtained as the first transmitted chunk is transmitted to the player.

18. The computer-readable storage medium of claim 16, wherein the processing system comprises a server.

19. The computer-readable storage medium of claim 18, wherein the streaming media is stored at the server.

20. The computer-readable storage medium of claim 16, wherein the target buffer level indicates a percentage that a buffer associated with the player is currently filled.

* * * * *